(12) United States Patent
Ishigami

(10) Patent No.: US 8,414,199 B2
(45) Date of Patent: Apr. 9, 2013

(54) OPTICAL CONNECTOR AND LENS BLOCK CONNECTING STRUCTURE, AND OPTICAL MODULE

(75) Inventor: Yoshiaki Ishigami, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 262 days.

(21) Appl. No.: 12/951,406

(22) Filed: Nov. 22, 2010

(65) Prior Publication Data

US 2011/0164851 A1    Jul. 7, 2011

(30) Foreign Application Priority Data

Jan. 7, 2010 (JP) ................................. 2010-002207
Jan. 29, 2010 (JP) ................................. 2010-019168

(51) Int. Cl.
*G02B 6/36* (2006.01)
*G02B 6/32* (2006.01)

(52) U.S. Cl.
USPC ............... 385/93; 385/15; 385/31; 385/33; 385/88; 385/89; 385/90; 385/92; 385/94

(58) Field of Classification Search ............ 385/93
See application file for complete search history.

(56) References Cited

U.S. PATENT DOCUMENTS 7,399,125 B1 * 7/2008 Whaley et al. ................. 385/92
2008/0232737 A1    9/2008 Ishigami et al.

FOREIGN PATENT DOCUMENTS

| JP | 2006-11092 | * | 1/2006 |
| JP | A-2006-011092 | | 1/2006 |
| JP | A-2008-224954 | | 9/2008 |

* cited by examiner

*Primary Examiner* — Ryan Lepisto
(74) *Attorney, Agent, or Firm* — Scully, Scott, Murphy & Presser, PC

(57) ABSTRACT

An optical connector and lens block connecting structure includes a substrate, an optical element, a lens frame including two side ribs, and a fore rib, a lens block for bending the optical path of the optical element to convert into an optical path parallel to the substrate, an optical connector provided at a fore end of an optical fiber cable, an optical connector frame including two side ribs and a rear rib, and an elastic member interposed between the rear rib of the optical connector frame and the optical connector. The optical connector frame is fixed to the substrate such that the optical connector is mounted to the lens block while the rear rib of the optical connector frame allows the elastic member to press the optical connector toward the lens block.

11 Claims, 18 Drawing Sheets

| 1 OPTICAL CONNECTOR AND LENS BLOCK CONNECTING STRUCTURE | 6 LENS BLOCK |
| --- | --- |
| 2 SUBSTRATE | 7 MT FERRULE |
| 4 OPTICAL FIBER CABLE | 10 OPTICAL CONNECTOR FRAME |
| 5 LENS FRAME | 14 COIL SPRING |

| 201 OPTICAL CONNECTOR AND LENS BLOCK CONNECTING STRUCTURE | 206 LENS BLOCK |
| --- | --- |
| 202 SUBSTRATE | 207 MT FERRULE |
| 204 OPTICAL FIBER CABLE | 210 OPTICAL CONNECTOR FRAME |
| 205 LENS FRAME | 214 COIL SPRING |
| | 215 RECEIVING HOLE |

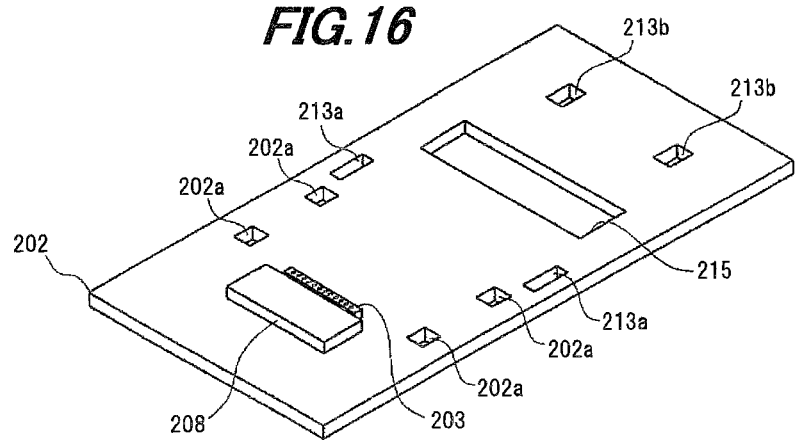
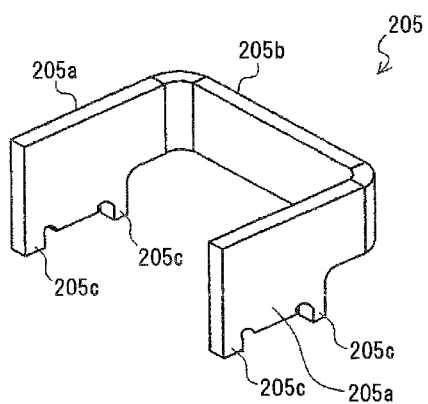

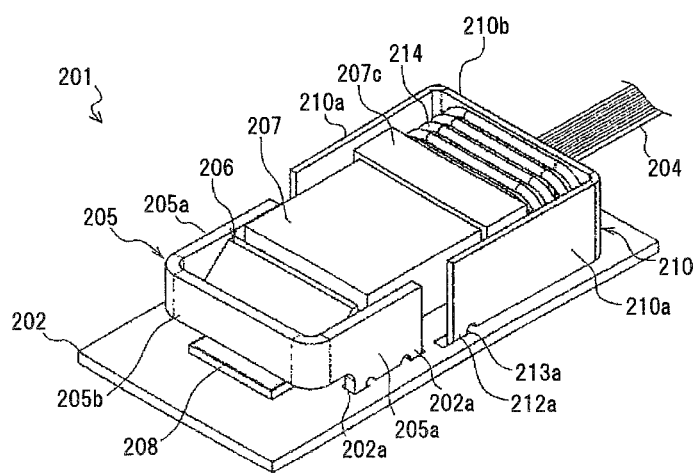
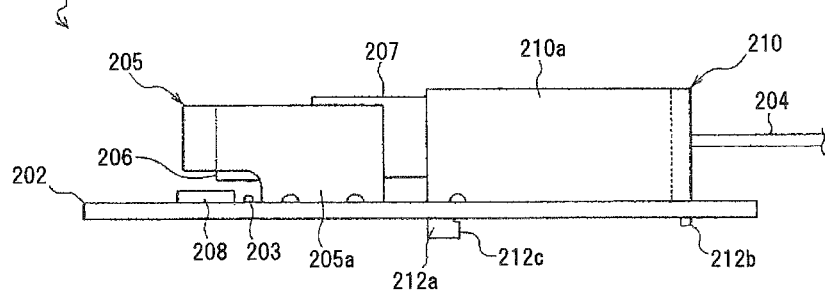

OPTICAL CONNECTOR AND LENS BLOCK CONNECTING STRUCTURE, AND OPTICAL MODULE

The present application is based on Japanese patent application Nos. 2010-002207 and 2010-019168 filed on Jan. 7, 2010 and Jan. 29, 2010, respectively, the entire contents of which are incorporated herein by reference.

BACKGROUND OF THE INVENTION

1. Field of the Invention

The present invention relates to an optical connector and lens block connecting structure for connecting an optical connector and a lens block provided at an end of an optical fiber cable, and an optical module using the connecting structure.

2. Description of the Related Art

Conventionally, devices, such as an optical transceiver and the like, generally use an optical element array (e.g. a VCSEL (vertical cavity surface) array or a PD (photodiode) array) having arrayed surface emitting elements or surface receiving elements.

In the optical element array using surface emitting elements or surface receiving elements, an optical path of light emitted from or received in the optical element array is perpendicular to a substrate mounted with the optical element array. On the other hand, in devices such as an optical transceiver and the like, an optical fiber cable optically connected with the optical element array is generally arranged parallel to the substrate mounted with the optical element array.

A known structure to optically connect the optical element array and the optical fiber cable has a lens block arranged above the optical element array to bend the optical path of light emitted from or received in the optical element array through 90 degrees to convert into an optical path parallel to the substrate, and an MT (mechanically transferable) ferrule provided at an end of the optical fiber cable for being mounted to the lens block.

Refer to JP-A-2008-224954 and JP-A-2006-11092, for example.

SUMMARY OF THE INVENTION

To prevent the optical axis misalignment between the optical element array and the lens block, the lens block is desirably bonded and fixed to a lens frame which is fixed to the substrate with the optical element array mounted thereon, while aligning the optical axis thereof with the optical element array.

When the MT ferrule is fixed to the lens block held in the lens frame, a ferrule support provided around the MT ferrule is coupled to the lens frame. The position of the ferrule support relative to the lens frame is fixed, and the position of the MT ferrule relative to the ferrule support is fixed. Consequently, the position of the MT ferrule relative to the lens frame is fixed, and therefore the MT ferrule cannot flexibly be transferred in correspondence with the position of the lens block relative to the lens frame. This may cause an undesired force to act on the lens block or the MT ferrule, leading to a malfunction.

On the other hand, in devices such as an optical transceiver and the like, it is considered that a sufficient space above the substrate cannot be ensured from the point of view of design (e.g. due to compliance with the I/O interface standard). In this case, when the height between the optical connector and lens block connecting portion and the substrate is great, the optical connector and lens block connecting structure cannot be arranged in the narrow space above the substrate.

Thus, it is an object of the present invention to provide an optical connector and lens block connecting structure and an optical module that allow the optical connector to be flexibly connected to the lens block in correspondence with the position of the lens block relative to a lens frame.

It is another object of the invention to provide an optical connector and lens block connecting structure and an optical module that can reduce the height between the optical connector and lens block connecting portion and the substrate.

(1) According to one embodiment of the invention, an optical connector and lens block connecting structure comprises:

a substrate;

an optical element mounted on the substrate, and including an optical path perpendicular to the substrate;

a lens frame comprising two side ribs, and a fore rib for connecting those double side ribs at one end, the lens frame being fixed to the substrate in such a manner as to surround the optical element;

a lens block for bending the optical path of the optical element to convert into an optical path parallel to the substrate, the lens block being bonded and fixed to between the double side ribs of the lens frame with its optical axis aligned with an optical axis of the optical element;

an optical connector provided at a fore end of an optical fiber cable, the optical connector being arranged parallel to the substrate;

an optical connector frame comprising two side ribs which surround both sides of the optical connector, and a rear rib for connecting the two side ribs at an other end; and an elastic member interposed between the rear rib of the optical connector frame and the optical connector, wherein the optical connector frame is fixed to the substrate such that the optical connector is mounted to the lens block while the rear rib of the optical connector frame allows the elastic member to press the optical connector toward the lens block.

In the above embodiment (1) of the invention, the following modifications and changes can be made.

(i) The optical connector frame includes a protrusion which protrudes downward from the optical connector frame, the substrate includes an engagement hole that is engaged onto the protrusion of the optical connector frame, and the optical connector frame is fixed to the substrate by engaging the protrusion into the engagement hole of the substrate.

(ii) The protrusion comprises a fore protrusion which protrudes downward from one end of the double side ribs of the optical connector frame, and a rear protrusion which protrudes downward from the rear rib of the optical connector frame, and the fore protrusion includes a hook for preventing the optical connector frame from slipping upward from the substrate, the hook extending from a lower end of the fore protrusion to the other end.

(iii) The rear rib of the optical connector frame comprises a notch through which the optical fiber cable is passed.

(2) According to another embodiment of the invention, an optical module comprises:

the optical connector and lens block connecting structure according to the above embodiment (1).

In the above embodiment (2) of the invention, the following modifications and changes can be made.

(iv) The optical module further comprises:

a transmit side substrate; and a receive side substrate, wherein the optical connector and lens block connecting structure according to the above embodiment (1) is formed on a surface of the transmit side substrate, wherein the optical connector and lens block connecting structure according to the above embodiment (1) is formed on a surface of the receive side substrate, wherein the optical connector frame comprises a vertical height that is a distance to be held between the transmit side substrate and the receive side substrate, and wherein the transmit side substrate and the receive side substrate are arranged on top of each other with the respective surfaces facing each other, so that the transmit side substrate and the receive side substrate are held at a specified distance therebetween by the respective surfaces of the transmit side substrate and the receive side substrate contacting the optical connector frames opposite.

(3) According to another embodiment of the invention, an optical connector and lens block connecting structure comprises:

a substrate;

an optical element mounted on the substrate, and including an optical path perpendicular to the substrate;

a lens frame fixed to the substrate in such a manner as to surround the optical element;

a lens block for bending the optical path of the optical element to convert into an optical path parallel to the substrate, the lens block being bonded and fixed to the lens frame with its optical axis aligned with an optical axis of the optical element; and an optical connector provided at a fore end of an optical fiber cable, the optical connector being arranged parallel to the substrate, wherein the substrate includes a receiving hole for receiving a protruding portion of the optical connector, and the protruding portion of the optical connector is received in the receiving hole when the optical connector and the lens block are connected with each other.

In the above embodiment (3) of the invention, the following modifications and changes can be made.

(v) The substrate comprises a circuit board formed with a notch, and a base provided to block the notch on a reverse side of the circuit board, the receiving hole is formed in the circuit board, and the lens block and the lens frame are fixed to a surface of the base.

(vi) The optical connector and lens block connecting structure further comprises:

an optical connector frame comprising two side ribs which surround both sides of the optical connector, and a rear rib for connecting those two side ribs at an other end; and an elastic member interposed between the rear rib of the optical connector frame and the optical connector, wherein the optical connector frame is fixed to the substrate such that the optical connector is mounted to the lens block while the rear rib of the optical connector frame allows the elastic member to press the optical connector toward the lens block.

(vii) The optical connector frame includes a protrusion that protrudes downward from the optical connector frame, the substrate includes an engagement hole around the receiving hole that is engaged onto the protrusion of the optical connector frame, and the optical connector frame is fixed to the substrate, by engaging the protrusion into the engagement hole of the substrate.

(viii) The optical connector comprises an MT ferrule, and the protruding portion comprises a flange formed at a rear end of the MT ferrule.

(4) According to another embodiment of the invention, an optical module comprises:

the optical connector and lens block connecting structure according to the above embodiment (3).

In the above embodiment (4) of the invention, the following modifications and changes can be made.

(ix) The optical module further comprises:

a transmit side substrate; and a receive side substrate, wherein the optical connector and lens block connecting structure according to the above embodiment (3) is formed on a surface of the transmit side substrate, wherein the optical connector and lens block connecting structure according to the above embodiment (3) is formed on a surface of the receive side substrate, wherein the optical connector frames comprises a vertical height that is a distance to be held between the transmit side substrate and the receive side substrate, and wherein the transmit side substrate and the receive side substrate are arranged on top of each other with their respective surfaces facing each other, so that the transmit side substrate and the receive side substrate are held at a specified distance therebetween by the respective surfaces of the transmit side substrate and the receive side substrate contacting the optical connector frames opposite.

Points of the Invention

According to one embodiment of the invention, the position of an MT ferrule as an optical connector is not fixed relative to the optical connector frame. Therefore, when the MT ferrule is mounted and fixed to the lens block, it is possible to position and fix the MT ferrule in correspondence with the position of the lens block, even when the position of the lens block relative to the lens frame varies. This eliminates an undesired force acting on the lens block or the MT ferrule. Thus, it is possible to employ the structure of bonding and fixing the lens block to the lens frame fixed to the substrate, thereby being unlikely to cause an optical axis misalignment between the optical element and the lens block.

According to another embodiment of the invention, when the MT connector and the lens block are connected with each other, the protruding portion of the MT connector is arranged to be received in the receiving hole. It is therefore possible to remove the interference between the MT connector and the substrate, and reduce the height between the optical connector and lens block connecting portion and the substrate. Thus, even where a sufficient space cannot be ensured on the substrate, the optical connector and lens block connecting structure can be arranged in that narrow space.

BRIEF DESCRIPTION OF THE DRAWINGS

The preferred embodiments according to the invention will be explained below referring to the drawings, wherein:

FIG. 16 is a perspective view showing a substrate for the optical connector and lens block connecting structure of FIG. 14;

FIG. 17 is perspective view showing a lens frame for the optical connector and lens block connecting structure of FIG. 14;

FIGS. 20A and 20B are a perspective view and a side view, respectively, showing an appearance of the optical connector and lens block connecting structure of FIG. 14;

DETAILED DESCRIPTION OF THE PREFERRED EMBODIMENTS

First Embodiment

Below is described a first preferred embodiment according to the invention, referring to the accompanying drawings.

Figure 1:
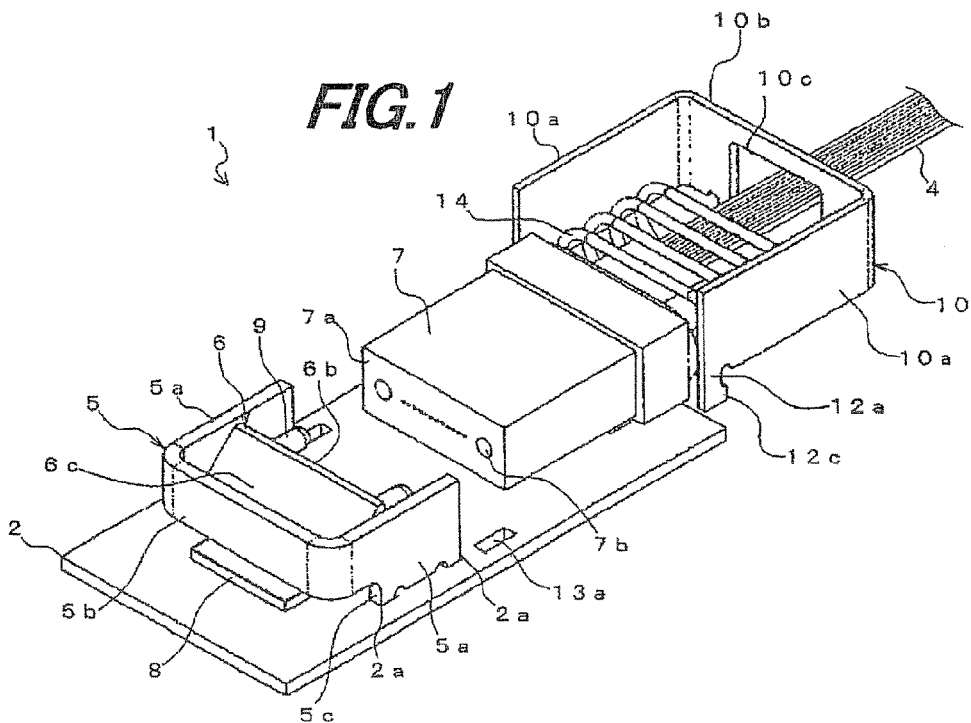
FIG. 1 is an exploded perspective view showing an optical connector and lens block connecting structure in a first embodiment according to the invention.
Figure 2:
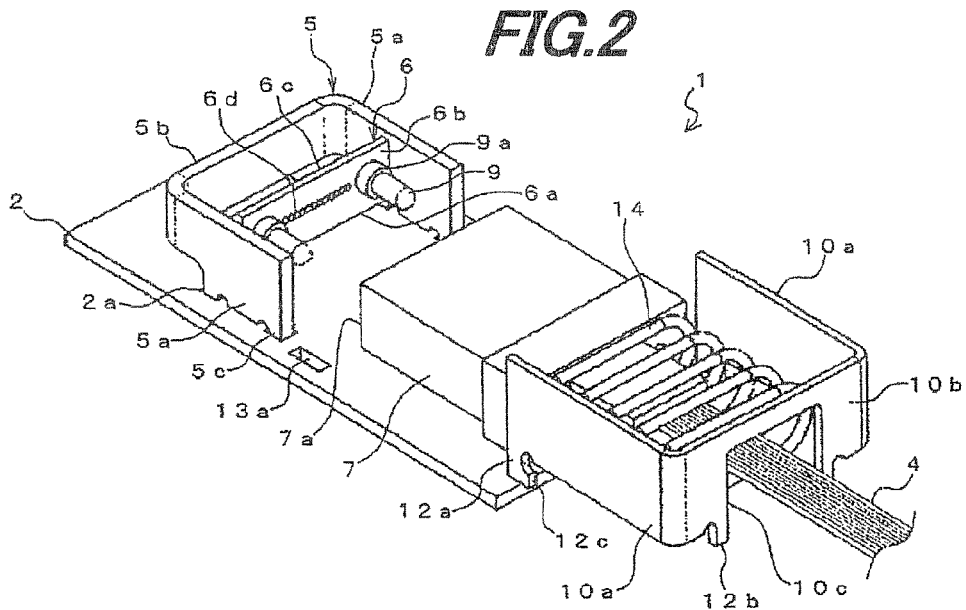
FIG. 2 is an exploded perspective view in another direction showing the an optical connector and lens block connecting structure of FIG. 1.

FIGS. 1 and 2 are exploded perspective views showing an optical connector and lens block connecting structure in the first embodiment.

As shown in FIGS. 1 and 2, the optical connector and lens block connecting structure 1 is structured to fix a lens block 6 and an MT ferrule 7 as an optical connector. The lens block 6 is disposed above an optical element 3 (see FIG. 3) and supported by a lens frame 5 fixed to a substrate 2. The MT ferrule 7 is provided at a fore end of an optical fiber cable 4. The lens block 6 optically connects the optical element 3 mounted on the substrate 2 to the optical fiber cable 4.

Optical Element 3 and Substrate 2

Figure 3:
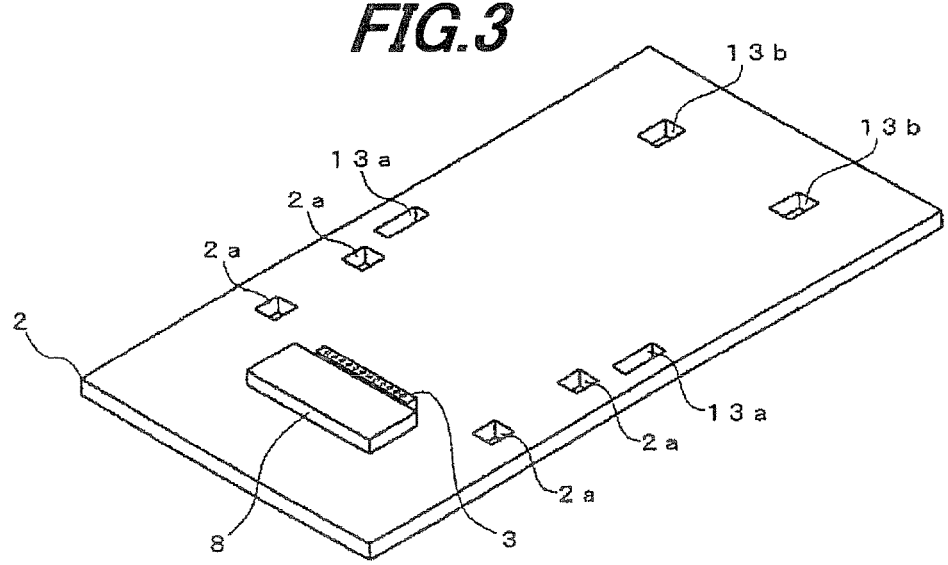
FIG. 3 is a perspective view showing a substrate for the optical connector and lens block connecting structure of FIG. 1.

As shown in FIGS. 1 to 3, the optical element 3 is mounted on the substrate 2 and has an optical path perpendicular to the substrate 2. The optical element 3 is e.g. a VCSEL array or a PD array, having arrayed surface emitting elements, or surface receiving elements for receiving light perpendicularly from above the substrate 2. Herein is described an example of the optical element 3 using the VCSEL array having arrayed twelve surface emitting elements.

The substrate 2 is formed of a printed board such as a glass epoxy substrate or the like, or a metal such as a kovar or the like. Mounted on the substrate 2 are the optical element 3, a driver IC 8 for driving the optical element 3, the lens frame 5 for holding the lens block 6, and an optical connector frame 10 for mounting and fixing the MT ferrule 7 to the lens block 6. The substrate 2 is formed with four lens frame fixing holes 2a for positioning and fixing the lens frame 5, and also engagement holes 13a and 13b for engaging later-described fore and rear protrusions 12a and 12b, respectively, of the optical connector frame 10.

Lens Frame 5

Figure 4:
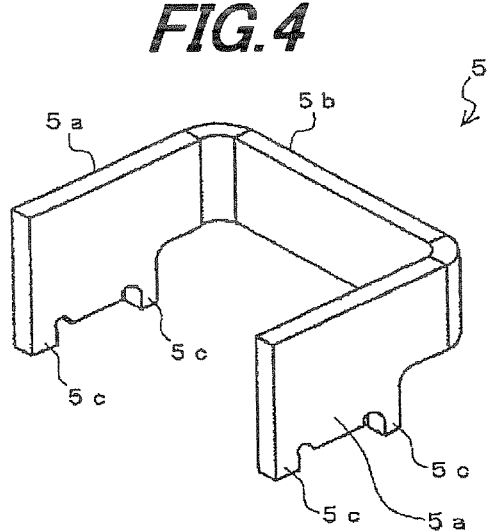
FIG. 4 is a perspective view showing a lens frame for the optical connector and lens block connecting structure of FIG. 1.

As shown in FIGS. 1, 2 and 4, the lens frame 5 is formed in a substantially U shape in a top view that includes two side ribs 5a, and a fore rib 5b for connecting those double side ribs 5a at one end (in FIG. 4, at the far right end). The lens frame 5 is formed by cutting and bending one metal plate.

The double side ribs 5a of the lens frame 5 are each formed with two legs 5c which protrude downward from its lower end and which are mated into the lens frame fixing holes 2a of the substrate 2. The lens frame 5 is positioned and fixed to the substrate 2 by mating its legs 5c into the lens frame fixing holes 2a of the substrate 2. The lens frame 5 is fixed to the substrate 2 in such a manner as to surround the optical element 3.

Lens Block 6

As shown in FIGS. 1 and 2, the lens block 6 is for bending the optical path of light emitted from or received in the optical element 3 through 90 degrees to convert into an optical path parallel to the substrate 2, to optically connect the optical element 3 and the MT ferrule 7 arranged parallel to the substrate 2. The lens block 6 is formed in a substantially triangular prism shape that includes a substrate opposing face 6a opposed to the optical element 3 disposed on the substrate 2, an MT ferrule connecting face 6b perpendicular to the substrate opposing face 6a, and an inclined face 6c inclined at 45 degrees to the substrate opposing face 6a and the MT ferrule connecting face 6b. The substrate opposing face 6a and the MT ferrule connecting face 6b are provided with an array of twelve lenses 6d in correspondence with light emitting elements, respectively, of the optical element 3.

The lens block 6 is bonded and fixed to between the double side ribs 5a of the lens frame 5 with the optical axis of twelve lenses (not shown which are formed on the substrate opposing face 6a) aligned with the optical axis of the optical element 3. Specifically, after the optical axes of the lens block 6 and the optical element 3 are aligned with each other, a UV curable resin is provided between the lens block 6 and the double side ribs 5a of the lens frame 5, and irradiated with ultraviolet rays (UV) to cure the UV curable resin, and thereby bond and fix the lens block 6 to the lens frame 5.

On both sides of the MT ferrule connecting face 6b of the lens block 6 is formed a pin 9 for positioning the MT ferrule 7. At the base end of the pin 9 is formed an increased diameter portion 9a. The diameter of the increased diameter portion 9a is formed to be greater than a mating hole 7b of the MT ferrule 7. Further, the length in the optical axis direction of the increased diameter portion 9a is such that a fore end face 7a of the MT ferrule 7 and the MT ferrule connecting face 6b of the lens block 6 are held at a specified distance therebetween to prevent the fore end face 7a of the MT ferrule 7 from interfering with the lenses 6d.

Optical Fiber Cable 4 and Optical Connector 7

The optical fiber cable 4 is a bundle of twelve optical fibers, and is provided with the twelve-core MT ferrule 7 at its end as the optical connector. In this embodiment, the optical connector uses the MT ferrule 7, but is not limited thereto.

In both sides of the fore end face 7a of the MT ferrule 7 is formed a mating hole 7b which is mated onto the pin 9 of the lens block 6. Mating the mating hole 7b onto the pin 9 allows the MT ferrule 7 to be positioned relative to the lens block 6 and mounted to the lens block 6.

Mounting the MT ferrule 7 to the lens block 6 allows the optical element array 3 and the optical fiber cable 4 to be optically connected with each other via the lens block 6 and the MT ferrule 7.

Optical Connector Frame 10 and Elastic Member 14

Around the MT ferrule 7, there is provided the optical connector frame 10 for mounting and fixing the MT ferrule 7 to the lens block 6.

Figure 5A:
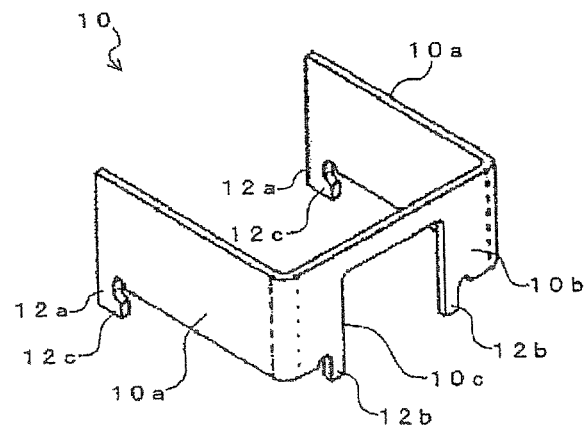
FIGS. 5A and 5B are perspective views showing an optical connector frame for the optical connector and lens block connecting structure of FIG. 1.
Figure 5B:
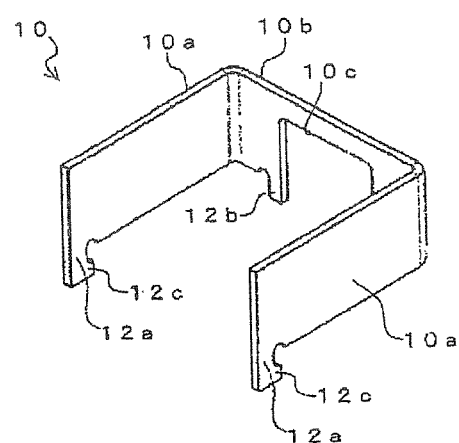

As shown in FIGS. 1, 2, 5A and 5B, the optical connector frame 10 is formed in a substantially U shape in a top view that includes two side ribs 10a which surround both sides of the MT ferrule 7, and a rear rib 10b for connecting those double side ribs 10a at one end (in FIG. 5A, at the near right end). The optical connector frame 10 is formed by cutting and bending one metal plate. The metal plate is formed of an elastic material, such as SUS.

The width between the double side ribs 10a of the optical connector frame 10 is greater than the width of the MT ferrule 7, to prevent the double side ribs 10a of the optical connector frame 10 from contacting the MT ferrule 7.

The double side ribs 10a of the optical connector frame 10 are each formed with a fore protrusion 12a which protrudes downward from the other end (in FIG. 5A, at the far left end), while the rear rib 10b of the optical connector frame 10 is formed with two rear protrusions 12b which protrude downward from the rear rib 10b. The fore protrusions 12a are each formed with a hook 12c which extends from the lower end of the fore protrusions 12a to the one end (in FIG. 5A, at the near right end). This hook 12c is for preventing the optical connector frame 10 from slipping upward from the substrate 2, as described in detail later.

The rear rib 10b of the optical connector frame 10 is formed with a notch 10c through which the optical fiber cable 4 is passed. The notch 10c is formed in the rear rib 10b in such a manner that it opens downward.

Also, a coil spring 14 is interposed between the rear rib 10b of the optical connector frame 10 and the MT ferrule 7, as an elastic member. The coil spring 14 is supported by the optical fiber cable 4 by passing the optical fiber cable 4 through the hollow of the coil spring 14.

Optical Connector and Lens Block Connecting Structure 1

Figure 6A:
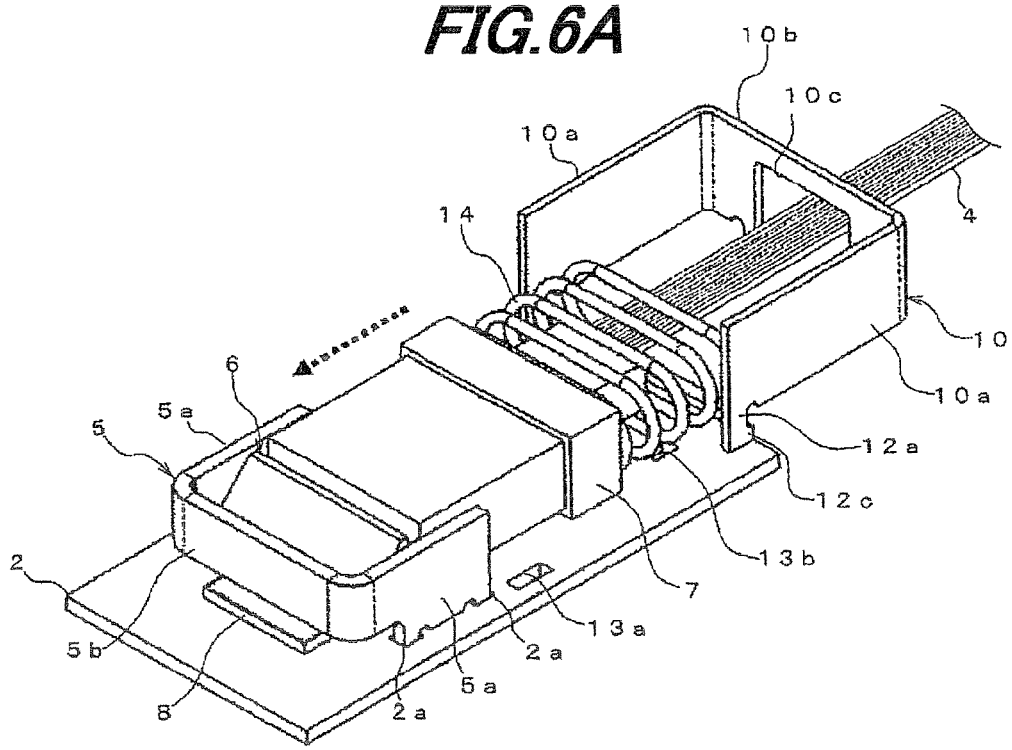
FIGS. 6A and 6B are diagrams for explaining a procedure for fixing the optical connector to the lens block, in the optical connector and lens block connecting structure of FIG. 1.
Figure 6B:
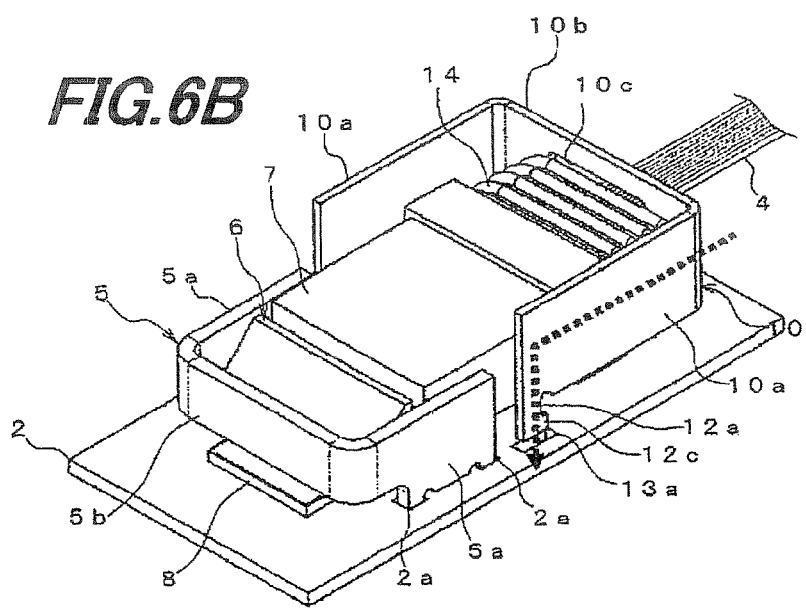

When the MT ferrule 7 is fixed to the lens block 6, as shown in FIG. 6A, the pins 9 of the lens block 6 and the mating holes 7b of the MT ferrule 7 are first mated together, to thereby mount the MT ferrule 7 to the lens block 6. Thereafter, as shown in FIG. 6B, the rear rib 10b of the optical connector frame 10 is caused to press the MT ferrule 7 via the coil spring 14 toward the lens block 6, and the optical connector frame 10 is then fixed to the substrate 2, thereby fixing the MT ferrule 7 to the lens block 6.

With the optical connector and lens block connecting structure 1 in this embodiment, the optical connector frame 10 is then fixed to the substrate 2, by engaging its fore protrusions 12a into the engagement holes 13a of the substrate 2 and its rear protrusions 12b into the engagement holes 13b of the substrate 2.

Figure 7A:
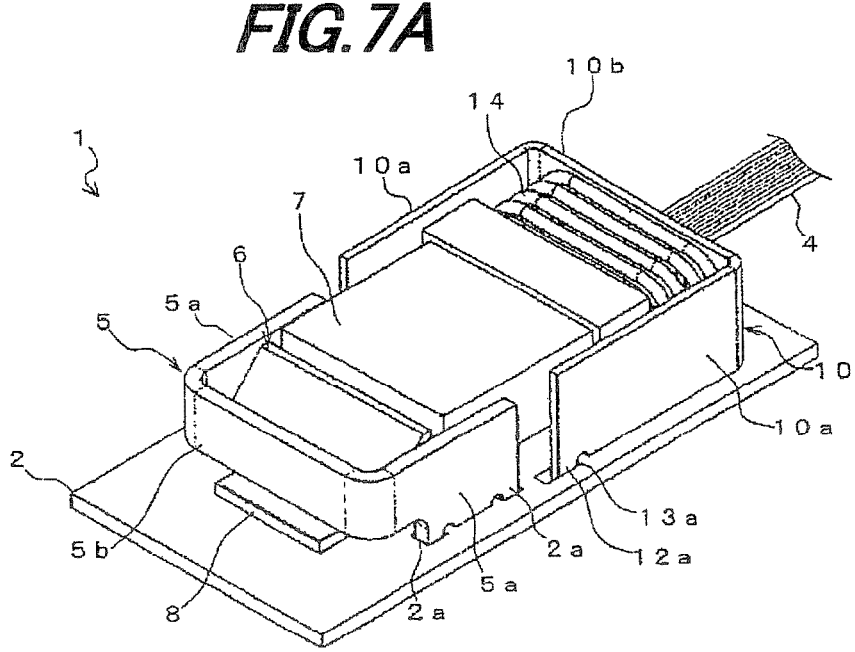
FIGS. 7A and 7B are a perspective view and a side view, respectively, showing an appearance of the optical connector and lens block connecting structure of FIG. 1.
Figure 7B:
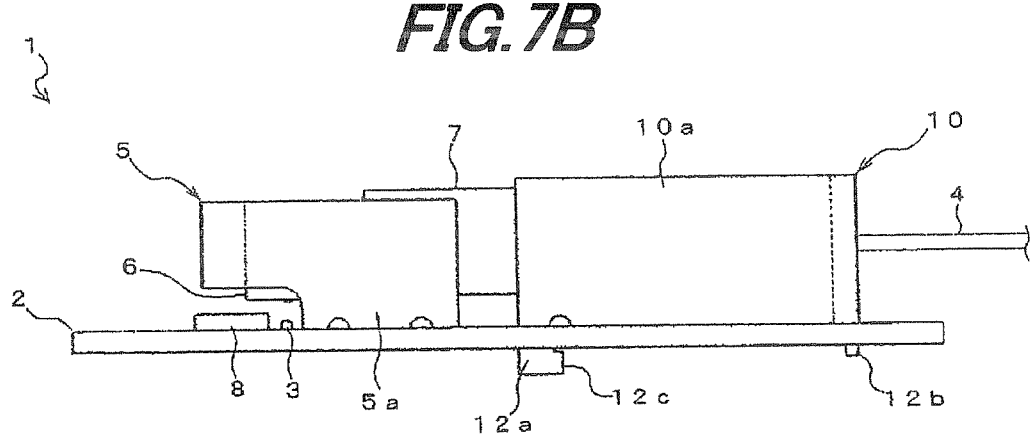

More specifically, the optical connector frame 10 is pressed toward the lens block 6, and with the rear rib 10b of the optical connector frame 10 thereby pressing the coil spring 14 and the MT ferrule 7 toward the lens block 6, the fore and rear protrusions 12a and 12b of the optical connector frame 10 are engaged into the engagement holes 13a and 13b, respectively, of the substrate 2. Thereafter, as shown in FIGS. 7A and 7B, the pressing force acting on the optical connector frame 10 is removed, thereby allowing the optical connector frame 10 to be biased rearward by the coil spring 14, to press the fore and rear protrusions 12a and 12b to the other end (in FIG. 7B, to the right) in the engagement holes 13a and 13b, respectively, and thereby fix the optical connector frame 10 to the substrate 2.

With this embodiment, since the hooks 12c are formed at the lower ends of the fore protrusions 12a respectively, the hooks 12c are engaged on the reverse of the substrate 2 when the optical connector frame 10 is biased rearward. This allows the optical connector frame 10 to be inhibited from slipping upward from the substrate 2.

To release the engagement of the substrate 2 and the optical connector frame 10, with the optical connector frame 10 being pressed toward the lens block 6 to release the engagement of the hooks 12c, the optical connector frame 10 may be lifted upward. This allows the engagement of the substrate 2 and the optical connector frame 10 to be released, thereby removing the MT ferrule 7 from the lens block 6.

Operation and Advantages of the First Embodiment

Operation and advantages of the first embodiment are described.

With the optical connector and lens block connecting structure 1 in this embodiment, the position of the MT ferrule 7 is not fixed relative to the optical connector frame 10. Therefore, when the MT ferrule 7 is mounted and fixed to the lens block 6, it is possible to position and fix the MT ferrule 7 in correspondence with the position of the lens block 6, even when the position of the lens block 6 relative to the lens frame 5 varies. This eliminates an undesired force acting on the lens block 6 or the MT ferrule 7. Thus, it is possible to employ the structure of bonding and fixing the lens block 6 to the lens frame 5 fixed to the substrate 2, thereby being unlikely to cause an optical axis misalignment between the optical element 3 and the lens block 6.

Also, with the optical connector and lens block connecting structure 1, since the optical connector frame 10 is fixed to the substrate 2, it is possible to stably hold the optical connector frame 10, in comparison with the structure of engaging the optical connector frame 10 with the lens frame 5, for example.

Further, with the optical connector and lens block connecting structure 1, since the protrusions 12a and 12b which protrude downward from the optical connector frame 10 are engaged into the engagement holes 13a and 13b respectively formed in the substrate 2, it is possible to realize the optical connector and lens block connecting structure 1 which has no member protruding upward from the MT ferrule 7 or the lens block 6, and which is therefore small in entire size.

Also, with the optical connector and lens block connecting structure 1, since the hooks 12c are formed at the lower ends of the fore protrusions 12a respectively, it is possible to prevent the optical connector frame 10 from slipping upward from the substrate 2. When the optical connector frame 10 is unlikely to slip upward from the substrate 2, such as when the optical connector frame 10 is held down from above, it is possible to omit the hooks 12c, however.

Further, with the optical connector and lens block connecting structure 1, the rear rib 10b of the optical connector frame 10 is formed with the notch 10c through which the optical fiber cable 4 is passed. This allows the optical connector frame 10 to be attached by covering the optical fiber cable 4 from above in the manner that passes the optical fiber cable 4 through the notch 10c. Thus, when the optical connector frame 10 is attached, it is possible to easily attach/detach the optical connector frame 10 with the MT ferrule 7 mounted to the lens block 6, and therefore facilitate handling.

Also, with the optical connector and lens block connecting structure 1, the engagement of the substrate 2 and the optical connector frame 10 can easily be released only by pressing the optical connector frame 10 toward the lens block 6 to release the engagement of the hooks 12c, and subsequently lift the optical connector frame 10 upward. This allows the MT ferrule 7 to be easily detached from the lens block 6.

Optical Module

Next is described an optical module equipped with the optical connector and lens block connecting structure 1 according to the invention.

Figure 8:
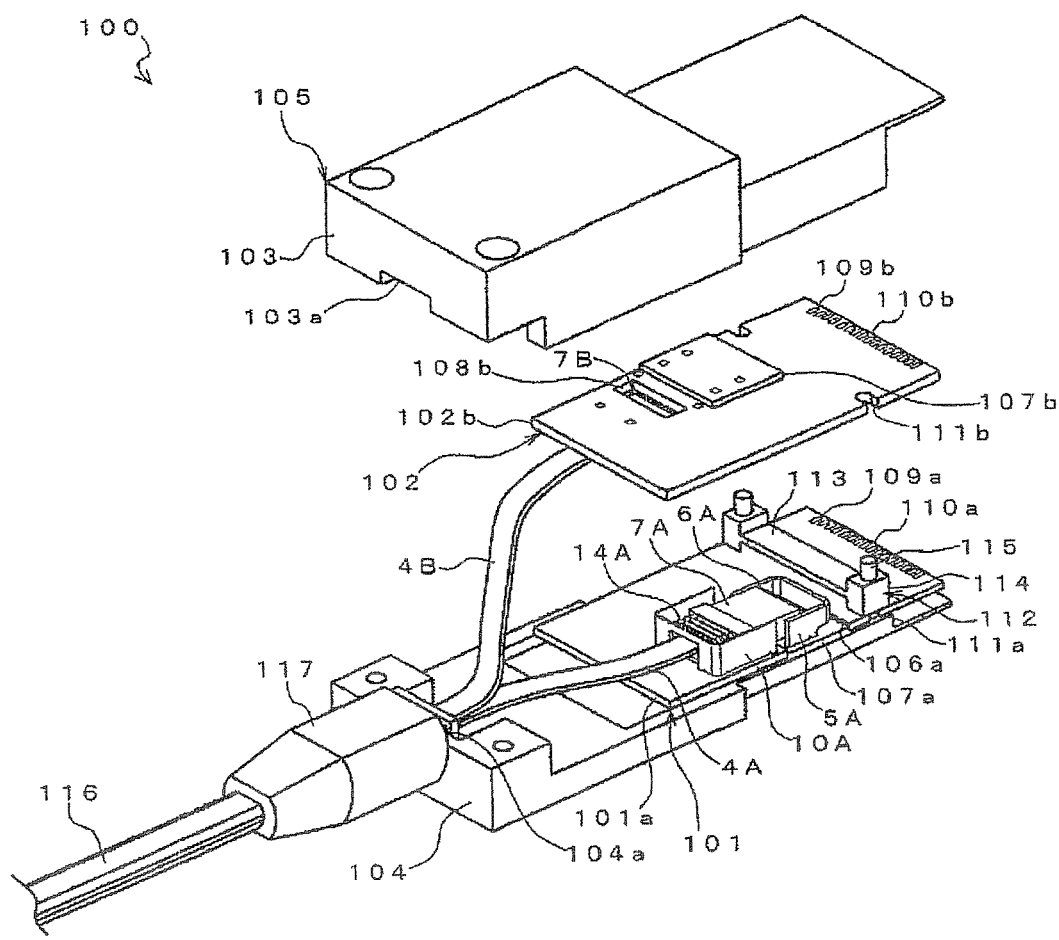
FIG. 8 is an exploded perspective view showing an optical module in the first embodiment according to the invention.

FIG. 8 is an exploded perspective view showing an optical module 100 equipped with the optical connector and lens block connecting structure 1 described with reference to FIGS. 1 to 7.

As shown in FIG. 8, the optical module 100 includes a transmit side substrate 101 whose surface is mounted with a light emitting element and a driver IC for driving the light emitting element, a receive side substrate 102 whose surface is mounted with a light receiving element and an amplifier IC for amplifying electrical signals from the light receiving element, and a chassis 105 comprising an upper chassis 103 and a lower chassis 104 for accommodating both the substrates 101 and 102.

The substrates 101 and 102 are arranged on top of each other with their respective surfaces facing each other. In this embodiment, the transmit side substrate 101 is arranged on the lower side while the receive side substrate 102 is arranged on the upper side. This upper and lower arrangement of the transmit side substrate 101 and the receive side substrate 102 complies with the I/O interface standard using the optical module 100.

In this embodiment, the transmit side substrate 101 and the receive side substrate 102 are structured in the same manner, including their optical connector and lens block connecting structure. Herein is described the transmit side substrate 101 in detail.

Transmit Side Substrate 101

Figure 9A:
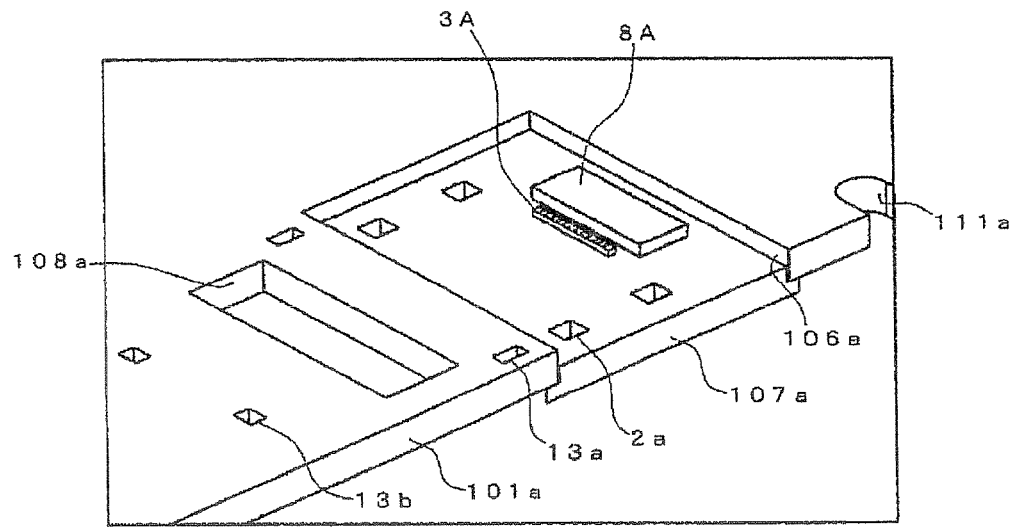
FIG. 9A is a perspective view showing a transmit side substrate of the optical module of FIG. 8 when a base is mounted with a light emitting element array and a driver IC.

As shown in FIG. 9A, one side (in FIG. 9A, the right-hand near side) of a transmit side circuit board 101a is formed with a notch 106a, and provided with a base 107a to block the notch 106a on the reverse of the transmit side circuit board 101a. The transmit side substrate 101 comprises the transmit side circuit board 101a and the base 107a.

The transmit side circuit board 101a is formed of a laminate substrate, for example. One end of the transmit side circuit board 101a is formed with a connection terminal 109a, and a card edge connector 110a.

The base 107a is formed of a metal, such as a copper tungsten (Cu—W), a kovar or the like, and electrically connected with a ground pattern not shown formed in an inner layer of the transmit side circuit board 101a. Also, when the transmit side substrate 101 is accommodated within the chassis 105, the base 107a contacts the lower chassis 104 via a heat dissipating sheet not shown, to be in thermal close contact with the lower chassis 104.

Figure 9B:
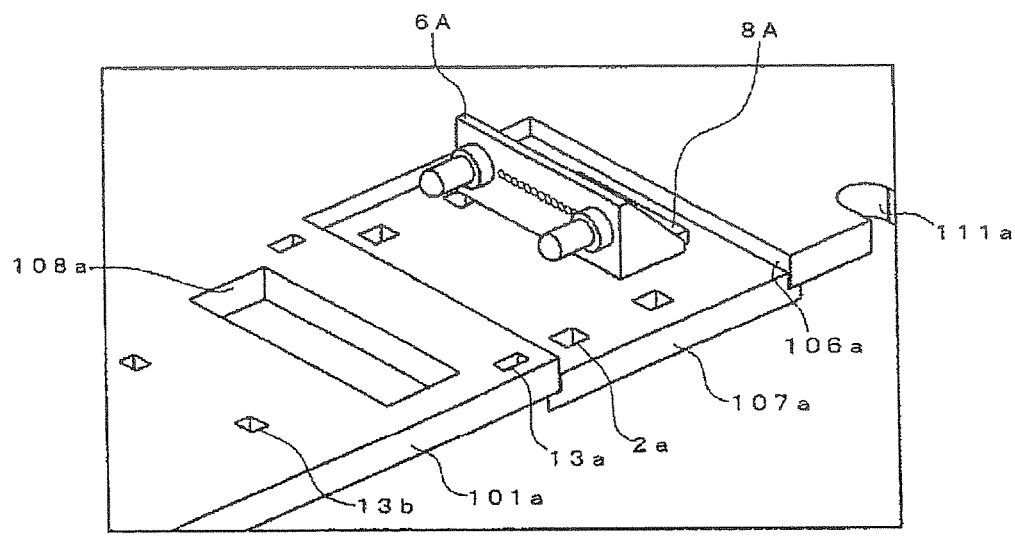
FIG. 9B is a perspective view showing the transmit side substrate of the optical module of FIG. 8 when there is further arranged a lens block.

On the base 107a are mounted a light emitting element array 3A (e.g. a VCSEL array or the like), and a driver IC 8A for driving the light emitting element array 3A. As shown in FIG. 9B, a lens block 6A is arranged above the light emitting element array 3A. The lens block 6A is supported by a lens frame 5A fixed to the base 107a, which is not shown in FIG. 9B. The base 107a is formed with four lens frame fixing holes 2a, and also the transmit side circuit board 101a is formed with engagement holes 13a and 13b for engaging protrusions 12a and 12b respectively of an optical connector frame 10A.

Figure 10:
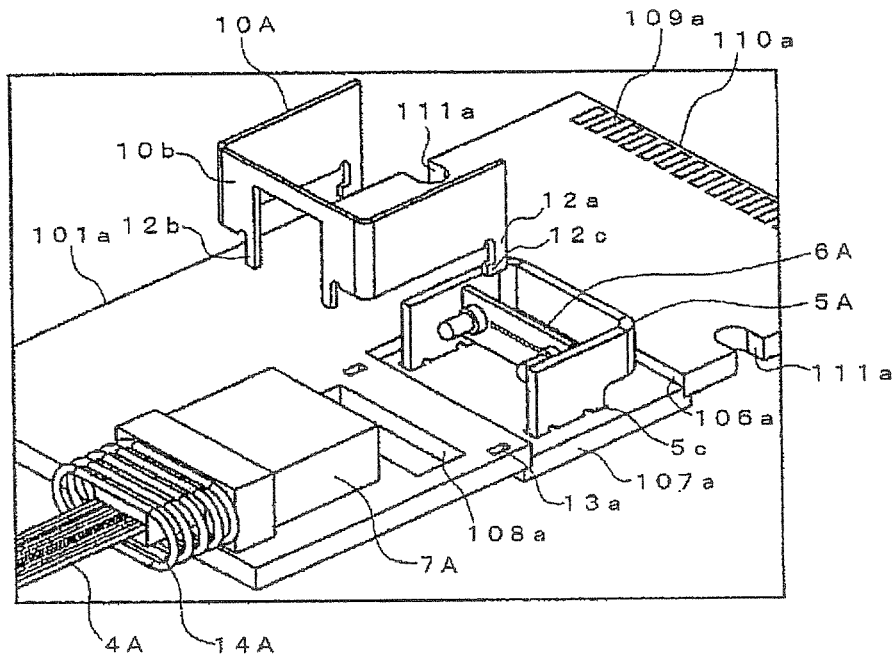
FIG. 10 is a diagram for explaining a procedure for fixing the optical connector to the lens block, in the transmit side substrate of FIGS. 9A and 9B.

As shown in FIG. 10, the lens frame 5A is fixed to the base 107a, by mating its legs 5c into the lens frame fixing holes 2a formed in the base 107a. The lens block 6A is bonded and fixed to the lens frame 5A with its optical axis aligned with the optical axis of the light emitting element array 3A.

The lens block 6A is connected with the MT ferrule 7A of the transmit side optical fiber cable 4A, so that the light emitting element array 3A and the transmit side optical fiber cable 4A are optically connected via the lens block 6A.

Figure 11:
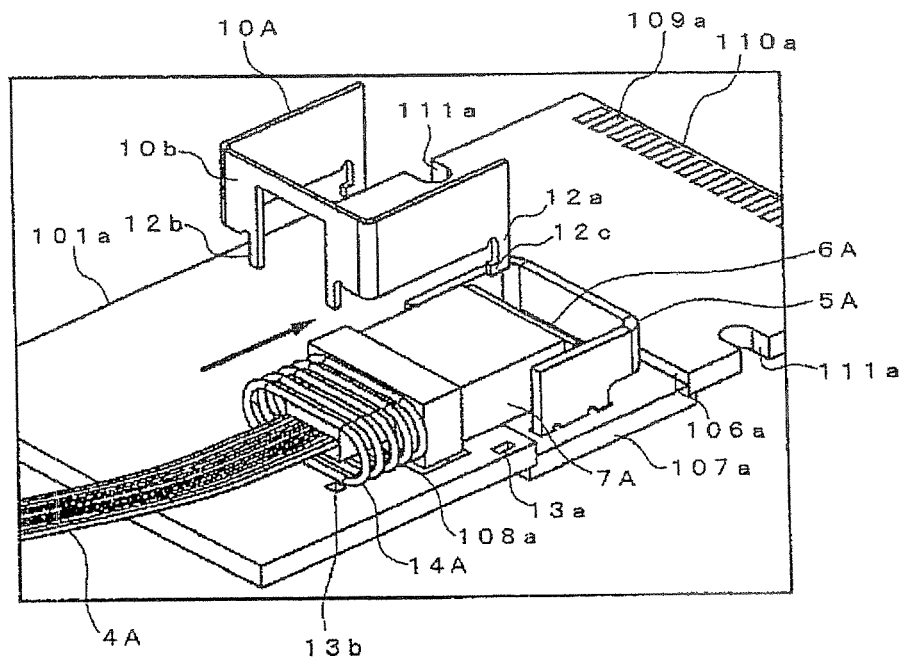
FIG. 11 is a diagram for explaining a procedure for fixing the optical connector to the lens block, in the transmit side substrate of FIGS. 9A and 9B.
Figure 12:
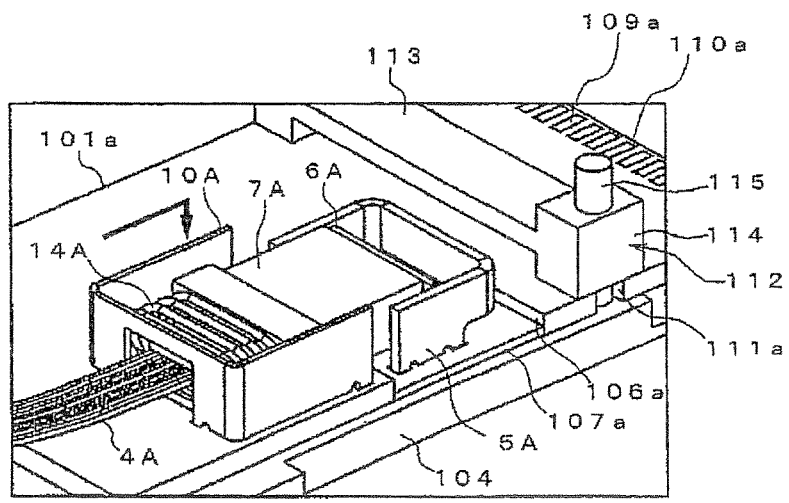
FIG. 12 is a diagram for explaining a procedure for fixing the optical connector to the lens block, in the transmit side substrate of FIGS. 9A and 9B.

To fix the MT ferrule 7A to the lens block 6A, after the MT ferrule 7A is mounted to the lens block 6A, with the rear rib 10b of the optical connector frame 10A being caused to press the MT ferrule 7A via the coil spring 14A toward the lens block 6A as shown in FIG. 11, the protrusions 12a and 12b of the optical connector frame 10A are engaged into the engagement holes 13a and 13b, thereby fixing the optical connector frame 10A to the transmit side circuit board 101a, as shown in FIG. 12. The transmit side circuit board 101a below the MT ferrule 7A is formed with a hole 108a for avoiding interference with the MT ferrule 7A.

Also, both sides of the transmit side circuit board 101a at the card edge connector 110a side end relative to the position of the notch 106a formed are formed with spacer fixing notches 111a, respectively, to which a spacer 112 is fixed, as described later.

Receive Side Substrate 102

The receive side substrate 102 is structured in the same manner as the transmit side substrate 101, by replacing the light emitting element array 3A with a light receiving element 3B and the driver IC 8A with an amplifier IC 8B for amplifying electrical signals.

The receive side substrate 102 comprises a receive side circuit board 102b and a base 107b. One end of the receive side circuit board 102b is formed with a connection terminal 109b, and a card edge connector 110b.

Optical Fiber Cable 116

As shown in FIG. 8, a transmitting/receiving optical fiber cable 116 is a bundle of transmit side optical fiber cable 4A and receive side optical fiber cable 4B.

An end of the transmitting/receiving optical fiber cable 116 is provide with a protective cover 117 formed of a resin for protecting the end of the transmitting/receiving optical fiber cable 116. The protective cover 117 is formed of a rubber boot, for example, that protects the transmitting/receiving optical fiber cable 116 so that the transmit side optical fiber cable 4A and the receive side optical fiber cable 4B are not bent beyond an allowable bend radius.

The transmitting/receiving optical fiber cable 116 branches at that end into the transmit side optical fiber cable 4A and the receive side optical fiber cable 4B. An end of the transmit side optical fiber cable 4A is provide with the MT ferrule 7A, while an end of the receive side optical fiber cable 4B is provide with the MT ferrule 7B.

Chassis 105, Upper Chassis 103 and Lower Chassis 104

The optical module 100 includes the chassis 105 for accommodating both the substrates 101 and 102.

The chassis 105 is formed to be split into the upper chassis 103 and the lower chassis 104. The upper chassis 103 and the lower chassis 104 are formed of a metal. The upper chassis 103 and the lower chassis 104 are fixed with screws not shown.

The rear faces (in FIG. 8, the left-hand near faces) of the upper chassis 103 and the lower chassis 104 are formed with engagement flanges 103a and 104a for engaging the protective cover 117 formed of a rubber boot provided at the end of the transmitting/receiving optical fiber cable 116. The transmitting/receiving optical fiber cable 116 is fixed to the chassis 105, by engaging the protective cover 117 formed of a rubber boot onto these engagement flanges 103a and 104a.

Spacer 112

Figure 13:
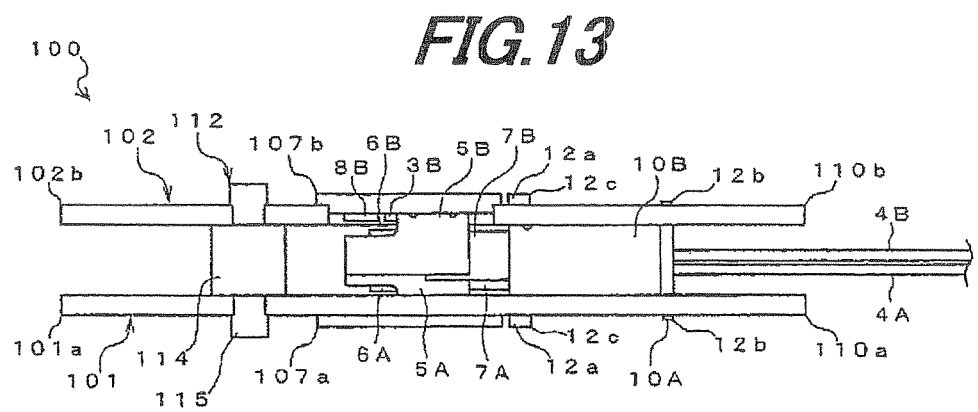
FIG. 13 is a side view showing the optical module of FIG. 8 when the transmit and receive side substrates are overlapped on top of each other.

As shown in FIGS. 8 and 13, the spacer 112 is a member for holding the transmit side substrate 101 and the receive side substrate 102 at a specified distance therebetween. The spacer 112 comprises a plate 113, prismatic supports 114 formed to protrude upward and downward a specified height from both ends respectively of the plate 113, and pins 115 formed to further protrude upward and downward from both the supports 114 respectively. The plate 113, the supports 114 and the pins 115 are formed integrally.

The spacer 112 is attached to between the transmit side circuit board 101a and the receive side circuit board 102b by inserting the downward protruding pins 115 into the spacer fixing notches 111a of the transmit side circuit board 101a, and the upward protruding pins 115 into the spacer fixing notches 111b of the receive side circuit board 102b. In this case, the respective lower faces of the supports 114 contact the surface of the transmit side circuit board 101a, while the respective upper faces of the supports 114 contact the surface of the receive side circuit board 102b.

Further, with the optical module 100 in this embodiment, the optical connector frames 10A and 10B also serve as spacers, so that the transmit side circuit board 101a and the receive side circuit board 102b are held at a specified distance therebetween by the above-described spacer 112, and the optical connector frames 10A and 10B.

The optical connector frame 10A provided on the transmit side circuit board 101a contacts the surface of the transmit side circuit board 101a at its lower portion, and the surface of the receive side circuit board 102b at its upper portion. Also, the optical connector frame 10B provided on the receive side circuit board 102b contacts the surface of the receive side circuit board 102b at its lower portion, and the surface of the transmit side circuit board 101a at its upper portion.

In this manner, the optical connector frames 10A and 10B also serve as spacers, thereby eliminating the need to provide a separate spacer, and therefore eliminating the need to ensure a space for providing the spacer on the substrates 101 and 102, thus contributing to low cost and small size of the optical module 100.

Also, with the optical module 100, the optical connector frame 10A is pressed toward the transmit side circuit board 101a by the receive side circuit board 102b, while the optical connector frame 10B is pressed toward the receive side circuit board 102b by the transmit side circuit board 101a. The optical connector frames 10A and 10B are therefore unlikely to slip from the substrates 101 and 102.

The length between the upper and lower faces of the supports 114 of the spacer 112, and the vertical height of the optical connector frames 10A and 10B may be the same as the distance to be held between the card edge connector 110a of the transmit side circuit board 101a and the card edge connector 110b of the receive side circuit board 102b, defined by the I/O interface standard.

Also, the side ribs 10a of the optical connector frames 10A and 10B may each be formed with an upward protrusion which protrudes upward, so that the upper portions of those upward protrusions contact the circuit boards 102b and 101a opposite. This reduces the contact area of the optical connector frames 10A and 10B with the circuit boards 102b and 101a opposite, therefore allowing high degrees of freedom of wiring patterns formed on the surfaces of both the circuit boards 101a and 102b respectively. Further, the upward protrusions may be bent to be formed in a leaf spring shape. This allows the upward protrusions to be inhibited from damaging portions of the circuit boards 101a and 102b which the upward protrusions have contacted.

Also, the optical connector frames 10A and 10B and the lens frames 5A and 5B may be electrically connected with ground patterns of the circuit boards 101a and 102b, so that noise to the optical elements 3A and 3B is isolated at the optical connector frames 10A and 10B and the lens frames 5A and 5B. In this case, it is desirable that there be no gap between the optical connector frames 10A and 10B and the lens frames 5A and 5B, by extending the side ribs 10a of the optical connector frames 10A and 10B to the lens frames 5A and 5B.

Second Embodiment

Below is described a second preferred embodiment according to the invention, referring to the accompanying drawings.

Figure 14:
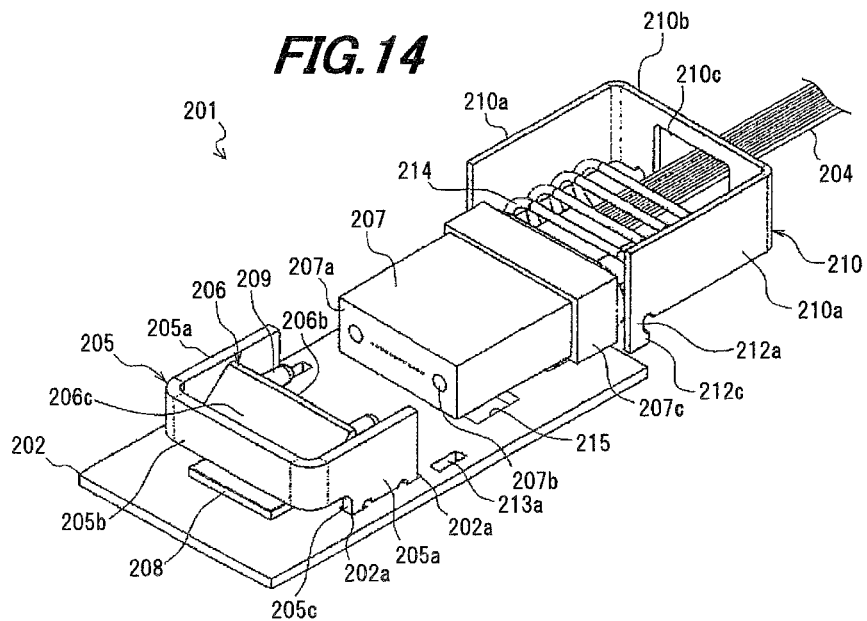
FIG. 14 is an exploded perspective view showing an optical connector and lens block connecting structure in a second embodiment according to the invention.
Figure 15:
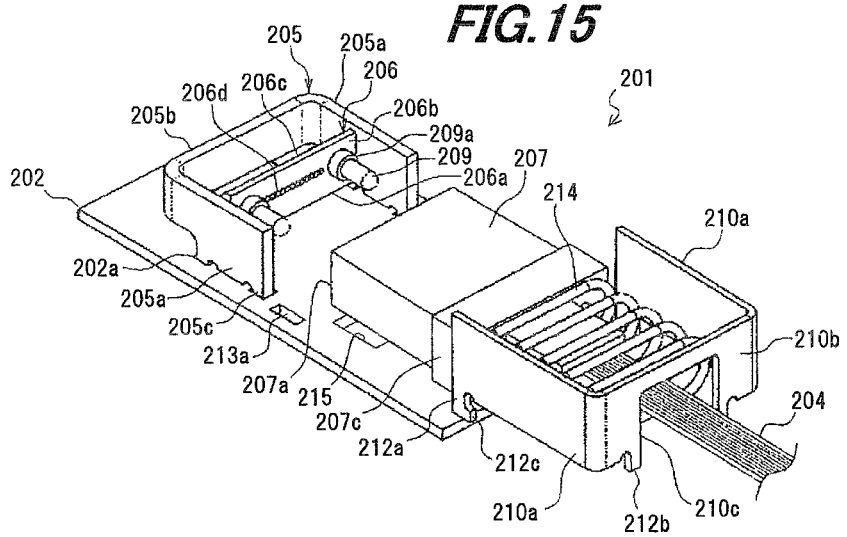
FIG. 15 is an exploded perspective view in another direction showing the optical connector and lens block connecting structure of FIG. 14.

FIGS. 14 and 15 are exploded perspective views showing an optical connector and lens block connecting structure in the second embodiment.

As shown in FIGS. 14 and 15, the optical connector and lens block connecting structure 201 is structured to fix a lens block 206 and an MT ferrule 207 as an optical connector. The lens block 206 is disposed above an optical element 203 (see FIG. 16) and supported by a lens frame 205 fixed to a substrate 202. The MT ferrule 207 is provided at a fore end of an optical fiber cable 204. The lens block 206 optically connects the optical element 203 mounted on the substrate 202 to the optical fiber cable 204.

Optical Element 203 and Substrate 202

As shown in FIGS. 14 to 16, the optical element 203 is mounted on the substrate 202 and has an optical path perpendicular to the substrate 202. The optical element 203 is e.g. a VCSEL array or a PD array, having arrayed surface emitting elements, or surface receiving elements for receiving light perpendicularly from above the substrate 202. Herein is described an example of the optical element 203 using the VCSEL array having arrayed twelve surface emitting elements.

The substrate 202 is formed of a printed board such as a glass epoxy substrate or the like, or a metal such as a kovar or the like. Mounted on the substrate 202 are the optical element 203, a driver IC 208 for driving the optical element 203, the lens frame 205 for holding the lens block 206, and an optical connector frame 210 for mounting and fixing the MT ferrule 207 to the lens block 206. The substrate 202 is formed with four lens frame fixing holes 202a for positioning and fixing the lens frame 205, and also a receiving hole 215 for receiving a protruding portion (flange 207c) of the MT ferrule 207. Around the receiving hole 215 are formed engagement holes 213a and 213b for engaging later-described fore and rear protrusions 212a and 212b, respectively, of the optical connector frame 210.

Lens Frame 205

As shown in FIGS. 14, 15 and 17, the lens frame 205 is formed in a substantially U shape in a top view that includes two side ribs 205a, and a fore rib 205b for connecting those double side ribs 205a at one end (in FIG. 17, at the far right end). The lens frame 205 is formed by cutting and bending one metal plate.

The double side ribs 205a of the lens frame 205 are each formed with two legs 205c which protrude downward from its lower end and which are mated into the lens frame fixing holes 202a of the substrate 202. The lens frame 205 is positioned and fixed to the substrate 202 by mating its legs 205c into the lens frame fixing holes 202a of the substrate 202. The lens frame 205 is fixed to the substrate 202 in such a manner as to surround the optical element 203.

Lens Block 206

As shown in FIGS. 14 and 15, the lens block 206 is for bending the optical path of light emitted from or received in the optical element 203 through 90 degrees to convert into an optical path parallel to the substrate 202, to optically connect the optical element 203 and the MT ferrule 207 arranged parallel to the substrate 202. The lens block 206 is formed in a substantially triangular prism shape that includes a substrate opposing face 206a opposed to the optical element 203 disposed on the substrate 202, an MT ferrule connecting face 206b perpendicular to the substrate opposing face 206a, and an inclined face 206c inclined at 45 degrees to the substrate opposing face 206a and the MT ferrule connecting face 206b. The substrate opposing face 206a and the MT ferrule connecting face 206b are provided with an array of twelve lenses 206d in correspondence with light emitting elements, respectively, of the optical element 203.

The lens block 206 is bonded and fixed to between the double side ribs 205a of the lens frame 205 with the optical axis of twelve lenses (not shown which are formed on the substrate opposing face 206a) aligned with the optical axis of the optical element 203. Specifically, after the optical axes of the lens block 206 and the optical element 203 are aligned with each other, a UV curable resin is provided between the lens block 206 and the double side ribs 205a of the lens frame 205, and irradiated with ultraviolet rays (UV) to cure the UV curable resin, and thereby bond and fix the lens block 206 to the lens frame 205.

On both sides of the MT ferrule connecting face 206b of the lens block 206 is formed a pin 209 for positioning the MT ferrule 207. At the base end of the pin 209 is formed an increased diameter portion 209a. The diameter of the increased diameter portion 209a is formed to be greater than a mating hole 207b of the MT ferrule 207. Further, the length in the optical axis direction of the increased diameter portion 209a is such that a fore end face 207a of the MT ferrule 207 and the MT ferrule connecting face 206b of the lens block 206 are held at a specified distance therebetween to prevent the fore end face 207a of the MT ferrule 207 from interfering with the lenses 206d.

Optical Fiber Cable 204 and Optical Connector 207

The optical fiber cable 204 is a bundle of twelve optical fibers, and is provided with the twelve-core MT ferrule 207 at its end as the optical connector. In this embodiment, the optical connector uses the MT ferrule 207, but is not limited thereto.

The MT ferrule 207 is formed in a rectangular parallelepiped shape. In both sides of the fore end face 207a of the MT ferrule 207 is formed a mating hole 207b which is mated onto the pin 209 of the lens block 206. Mating the mating hole 207b onto the pin 209 allows the MT ferrule 207 to be positioned relative to the lens block 206 and mounted to the lens block 206.

Also, the rear end of the MT ferrule 207 is formed with a flange 207c. This flange 207c serves as a protruding portion of the MT ferrule 207. This flange 207c is received in the receiving hole 215, when the MT ferrule 207 and the lens block 206 are connected with each other.

Mounting the MT ferrule 207 to the lens block 206 allows the optical element array 203 and the optical fiber cable 204 to be optically connected with each other via the lens block 206 and the MT ferrule 207.

Optical Connector Frame 210 and Elastic Member 214

Around the MT ferrule 207, there is provided the optical connector frame 210 for mounting and fixing the MT ferrule 207 to the lens block 206.

Figure 18A:
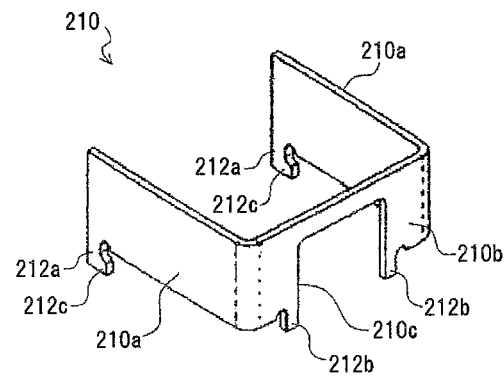
FIGS. 18A and 18B are perspective views showing an optical connector frame for the optical connector and lens block connecting structure of FIG. 14.
Figure 18B:
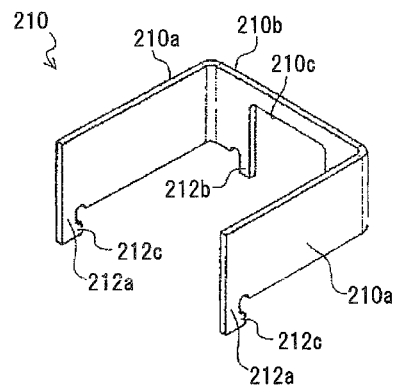

As shown in FIGS. 14, 15, 18A and 18B, the optical connector frame 210 is formed in a substantially U shape in a top view that includes two side ribs 210a which surround both sides of the MT ferrule 207, and a rear rib 210b for connecting those double side ribs 210a at one end (in FIG. 18A, at the near right end). The optical connector frame 210 is formed by cutting and bending one metal plate. The metal plate is formed of an elastic material, such as SUS.

The width between the double side ribs 210a of the optical connector frame 210 is greater than the width of the MT ferrule 207, to prevent the double side ribs 210a of the optical connector frame 210 from contacting the MT ferrule 207.

The double side ribs 210a of the optical connector frame 210 are each formed with a fore protrusion 212a which protrudes downward from the other end (in FIG. 18A, at the far left end), while the rear rib 210b of the optical connector frame 210 is formed with two rear protrusions 212b which protrude downward from the rear rib 210b. The fore protrusions 212a are each formed with a hook 212c which extends from the lower end of the fore protrusions 212a to the one end (in FIG. 18A, at the near right end). This hook 212c is for preventing the optical connector frame 210 from slipping upward from the substrate 202, as described in detail later.

The rear rib 210b of the optical connector frame 210 is formed with a notch 210c through which the optical fiber cable 204 is passed. The notch 210c is formed in the rear rib 210b in such a manner that it opens downward.

Also, a coil spring 214 is interposed between the rear rib 210b of the optical connector frame 210 and the MT ferrule 207, as an elastic member. The coil spring 214 is supported by the optical fiber cable 204 by passing the optical fiber cable 204 through the hollow of the coil spring 214.

Optical Connector and Lens Block Connecting Structure 201

Figure 19A:
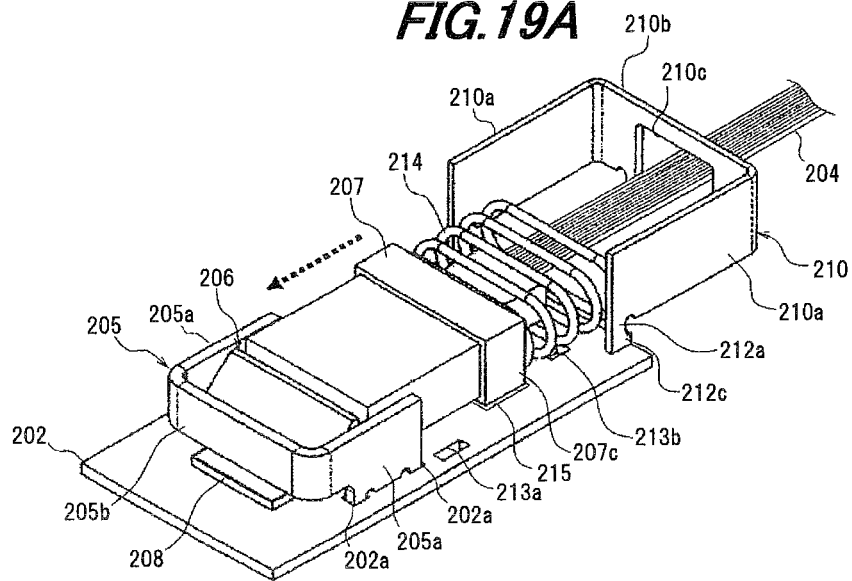
FIGS. 19A and 19B are diagrams for explaining a procedure for fixing the optical connector to the lens block, in the optical connector and lens block connecting structure of FIG. 14.

When the MT ferrule 207 is fixed to the lens block 206, as shown in FIG. 19A, the pins 209 of the lens block 206 and the mating holes 207b of the MT ferrule 207 are first mated together, to thereby mount the MT ferrule 207 to the lens block 206. The flange 207c, which serves as the protruding portion of the MT ferrule 207, is then arranged to be received in the receiving hole 215.

Figure 19B:
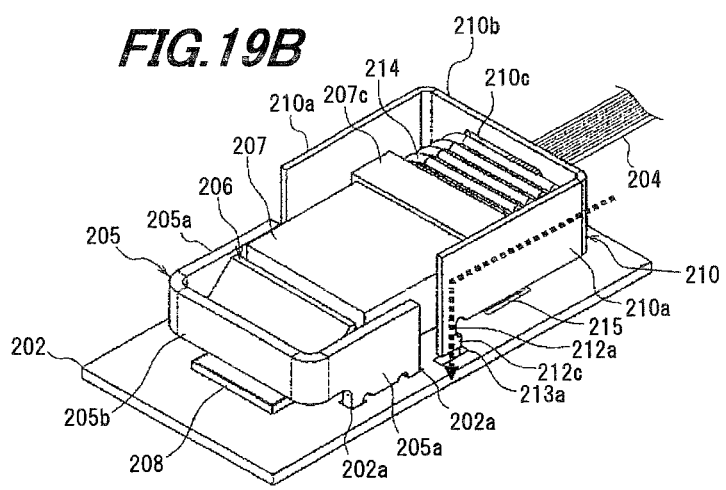

Thereafter, as shown in FIG. 19B, the rear rib 210b of the optical connector frame 210 is caused to press the MT ferrule 207 via the coil spring 214 toward the lens block 206, and the optical connector frame 210 is then fixed to the substrate 202, thereby fixing the MT ferrule 207 to the lens block 206.

With the optical connector and lens block connecting structure 201 in this embodiment, the optical connector frame 210 is then fixed to the substrate 202, by engaging its fore protrusions 212a into the engagement holes 213a of the substrate 202 and its rear protrusions 212b into the engagement holes 213b of the substrate 202.

More specifically, the optical connector frame 210 is pressed toward the lens block 206, and with the rear rib 210b of the optical connector frame 210 thereby pressing the coil spring 214 and the MT ferrule 207 toward the lens block 206, the fore and rear protrusions 212a and 212b of the optical connector frame 210 are engaged into the engagement holes 213a and 213b, respectively, of the substrate 202. Thereafter, as shown in FIGS. 20A and 20B, the pressing force acting on the optical connector frame 210 is removed, thereby allowing the optical connector frame 210 to be biased rearward by the coil spring 214, to press the fore and rear protrusions 212a and 212b to the other end (in FIG. 20B, to the right) in the engagement holes 213a and 213b, respectively, and thereby fix the optical connector frame 210 to the substrate 202.

With this embodiment, since the hooks 212c are formed at the lower ends of the fore protrusions 212a respectively, the hooks 212c are engaged on the reverse of the substrate 202 when the optical connector frame 210 is biased rearward. This allows the optical connector frame 210 to be inhibited from slipping upward from the substrate 202.

To release the engagement of the substrate 202 and the optical connector frame 210, with the optical connector frame 210 being pressed toward the lens block 206 to release the engagement of the hooks 212c, the optical connector frame 210 may be lifted upward. This allows the engagement of the substrate 202 and the optical connector frame 210 to be released, thereby removing the MT ferrule 207 from the lens block 206.

Operation and Advantages of the Second Embodiment

Operation and advantages of the second embodiment are described.

With the optical connector and lens block connecting structure 201 in this embodiment, when the MT ferrule 207 and the lens block 206 are connected with each other, the flange 207c which serves as the protruding portion of the MT ferrule 207 is arranged to be received in the receiving hole 215. It is therefore possible to remove the interference between the MT ferrule 207 and the substrate 202, and lower the height between the MT ferrule 207 and lens block 206 connecting portion, and the substrate 202. Thus, even where a sufficient space cannot be ensured on the substrate 202, the optical connector and lens block connecting structure 201 can be arranged in that narrow space.

Also, with the optical connector and lens block connecting structure 201, the position of the MT ferrule 207 is not fixed relative to the optical connector frame 210. Therefore, when the MT ferrule 207 is mounted and fixed to the lens block 206, it is possible to position and fix the MT ferrule 207 in correspondence with the position of the lens block 206, even when the position of the lens block 206 relative to the lens frame 205 varies. This eliminates an undesired force acting on the lens block 206 or the MT ferrule 207. Thus, it is possible to employ the structure of bonding and fixing the lens block 206 to the lens frame 205 fixed to the substrate 202, thereby being unlikely to cause an optical axis misalignment between the optical element 203 and the lens block 206.

Also, with the optical connector and lens block connecting structure 201, since the optical connector frame 210 is fixed to the substrate 202, it is possible to stably hold the optical connector frame 210, in comparison with the structure of engaging the optical connector frame 210 with the lens frame 205, for example.

Further, with the optical connector and lens block connecting structure 201, since the protrusions 212a and 212b which protrude downward from the optical connector frame 210 are engaged into the engagement holes 213a and 213b respectively formed in the substrate 202, it is possible to realize the optical connector and lens block connecting structure 201 which has no member protruding upward from the MT ferrule 207 or the lens block 206, and which is therefore small in entire size.

Also, with the optical connector and lens block connecting structure 201, since the hooks 212c are formed at the lower ends of the fore protrusions 212a respectively, it is possible to prevent the optical connector frame 210 from slipping upward from the substrate 202. When the optical connector frame 210 is unlikely to slip upward from the substrate 202, such as when the optical connector frame 210 is held down from above, it is possible to omit the hooks 212c, however.

Further, with the optical connector and lens block connecting structure 201, the rear rib 210b of the optical connector frame 210 is formed with the notch 210c through which the optical fiber cable 204 is passed. This allows the optical connector frame 210 to be attached by covering the optical fiber cable 204 from above in the manner that passes the optical fiber cable 204 through the notch 210c. Thus, when the optical connector frame 210 is attached, it is possible to easily attach/detach the optical connector frame 210 with the MT ferrule 207 mounted to the lens block 206, and therefore facilitate handling.

Also, with the optical connector and lens block connecting structure 201, the engagement of the substrate 202 and the optical connector frame 210 can easily be released only by pressing the optical connector frame 210 toward the lens block 206 to release the engagement of the hooks 212c, and subsequently lift the optical connector frame 210 upward. This allows the MT ferrule 207 to be easily detached from the lens block 206.

Optical Module

Next is described an optical module equipped with the optical connector and lens block connecting structure 201 according to the invention.

Figure 21:
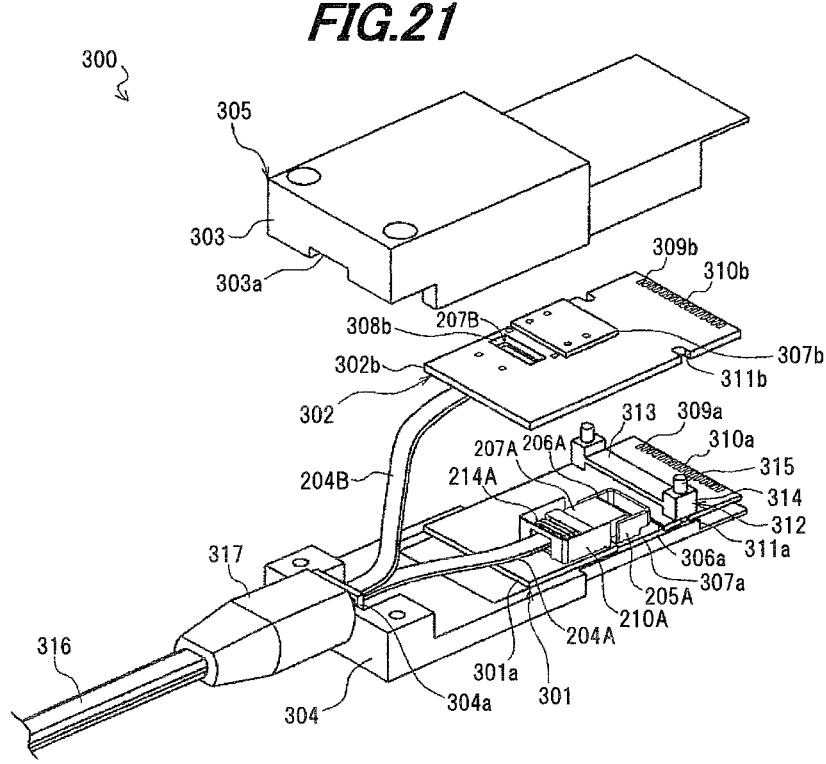
FIG. 21 is an exploded perspective view showing an optical module in the second embodiment according to the invention.

FIG. 21 is an exploded perspective view showing an optical module 300 equipped with the optical connector and lens block connecting structure 201 described with reference to FIGS. 14 to 20.

As shown in FIG. 21, the optical module 300 includes a transmit side substrate 101 whose surface is mounted with a light emitting element and a driver IC for driving the light emitting element, a receive side substrate 302 whose surface is mounted with a light receiving element and an amplifier IC for amplifying electrical signals from the light receiving element, and a chassis 305 comprising an upper chassis 303 and a lower chassis 304 for accommodating both the substrates 301 and 302.

The substrates 301 and 302 are arranged on top of each other with their respective surfaces facing each other. In this embodiment, the transmit side substrate 301 is arranged on the lower side while the receive side substrate 302 is arranged on the upper side. This upper and lower arrangement of the transmit side substrate 301 and the receive side substrate 302 complies with the I/O interface standard using the optical module 300.

In this embodiment, the transmit side substrate 301 and the receive side substrate 302 are structured in the same manner, including their optical connector and lens block connecting structure. Herein is described the transmit side substrate 301 in detail.

Transmit Side Substrate 301

Figure 22A:
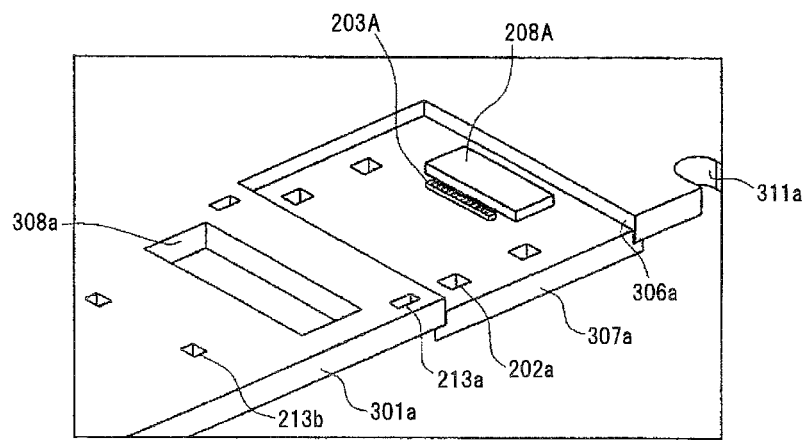
FIG. 22A is a perspective view showing a transmit side substrate of the optical module of FIG. 21 when a base is mounted with a light emitting element array and a driver IC.

As shown in FIG. 22A, one side (in FIG. 22A, the right-hand near side) of a transmit side circuit board 301a is formed with a notch 306a, and provided with a base 307a to block the notch 306a on the reverse of the transmit side circuit board 301a. The transmit side substrate 301 comprises the transmit side circuit board 301a and the base 307a.

The transmit side circuit board 301a is formed of a laminate substrate, for example. One end of the transmit side circuit board 301a is formed with a connection terminal 309a, and a card edge connector 310a.

The base 307a is formed of a metal, such as a copper tungsten (Cu—W), a kovar or the like, and electrically connected with a ground pattern not shown formed in an inner layer of the transmit side circuit board 301a. Also, when the transmit side substrate 301 is accommodated within the chassis 305, the base 307a contacts the lower chassis 304 via a heat dissipating sheet not shown, to be in thermal close contact with the lower chassis 304.

Figure 22B:
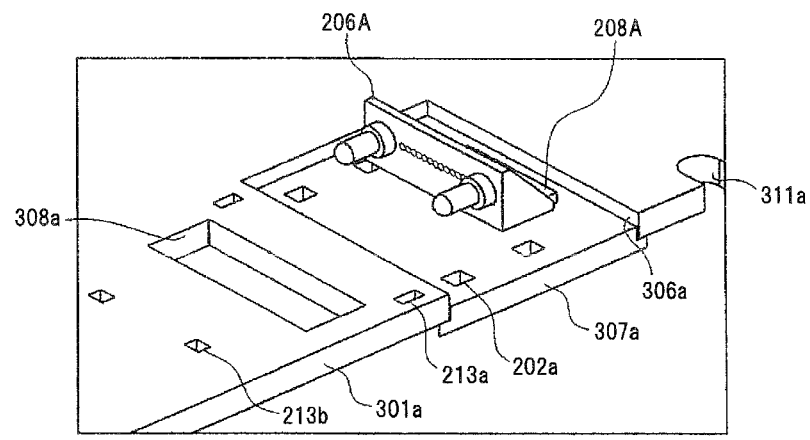
FIG. 22B is a perspective view showing the transmit side substrate of the optical module of FIG. 21 when there is further arranged a lens block.

On the base 307a are mounted a light emitting element array 203A (e.g. a VCSEL array or the like), and a driver IC 208A for driving the light emitting element array 203A. As shown in FIG. 22B, a lens block 206A is arranged above the light emitting element array 203A. The lens block 206A is supported by a lens frame 205A fixed to the base 307a, which is not shown in FIG. 22B. The base 307a is formed with four lens frame fixing holes 202a, and also the transmit side circuit board 301a is formed with engagement holes 213a and 213b for engaging protrusions 212a and 212b respectively of an optical connector frame 210A.

Figure 23:
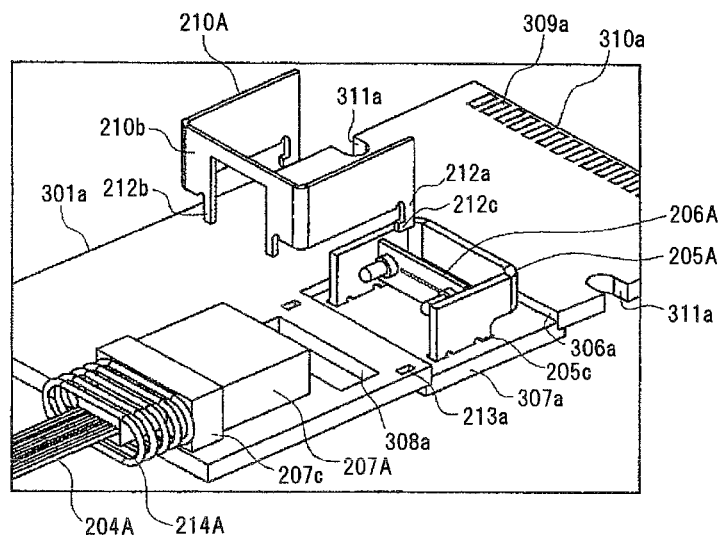
FIG. 23 is a diagram for explaining a procedure for fixing the optical connector to the lens block, in the transmit side substrate of FIGS. 22A and 22B.

As shown in FIG. 23, the lens frame 205A is fixed to the base 307a, by mating its legs 205c into the lens frame fixing holes 202a formed in the base 307a. The lens block 206A is bonded and fixed to the lens frame 205A with its optical axis aligned with the optical axis of the light emitting element array 203A.

The lens block 206A is connected with the MT ferrule 207A of the transmit side optical fiber cable 204A, so that the light emitting element array 203A and the transmit side optical fiber cable 204A are optically connected via the lens block 206A.

Figure 24:
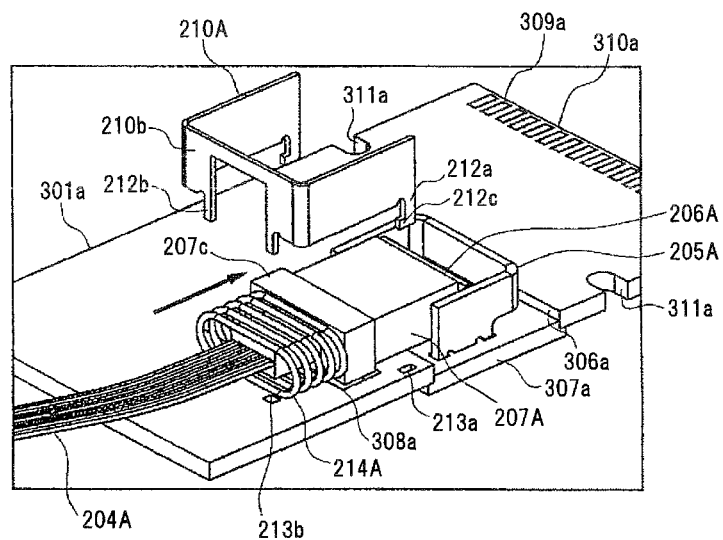
FIG. 24 is a diagram for explaining a procedure for fixing the optical connector to the lens block, in the transmit side substrate of FIGS. 22A and 22B.
Figure 25:
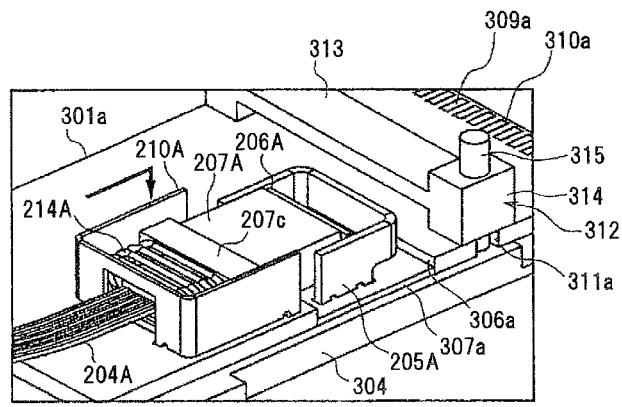
FIG. 25 is a diagram for explaining a procedure for fixing the optical connector to the lens block, in the transmit side substrate of FIGS. 22A and 22B.

To fix the MT ferrule 207A to the lens block 206A, after the MT ferrule 207A is mounted to the lens block 206A, with the rear rib 210b of the optical connector frame 210A being caused to press the MT ferrule 207A via the coil spring 214A toward the lens block 206A as shown in FIG. 24, the protrusions 212a and 212b of the optical connector frame 10A are engaged into the engagement holes 213a and 213b, thereby fixing the optical connector frame 210A to the transmit side circuit board 301a, as shown in FIG. 25. The transmit side circuit board 301a below the MT ferrule 207A is formed with a receiving hole 308a for receiving the flange 207c that is the protruding portion of the MT ferrule 207, to avoid interference with the MT ferrule 207A.

In this manner, the transmit side substrate 301 is constructed by the transmit side circuit board 301a and the base 307a, and the lens block 206A and the lens frame 205A are fixed to the base 307a, and the transmit side circuit board 301a is formed with the receiving hole 308a for receiving the flange 207c of the MT ferrule 207A, thereby allowing the height between the MT ferrule 207A and lens block 206A connecting portion, and the circuit board (transmit side circuit board 301a) to be lowered, compared with where the transmit side substrate 301 is formed by one circuit board.

Also, both sides of the transmit side circuit board 301a at the card edge connector 310a side end relative to the position of the notch 306a formed are formed with spacer fixing notches 311a, respectively, to which a spacer 312 is fixed, as described later.

Receive Side Substrate 302

The receive side substrate 302 is structured in the same manner as the transmit side substrate 301, by replacing the light emitting element array 203A with a light receiving element 203B and the driver IC 208A with an amplifier IC 208B for amplifying electrical signals.

The receive side substrate 302 comprises a receive side circuit board 302b and a base 307b. The receive side circuit board 302b is formed with a receiving hole 308b for receiving a flange 207c of the MT ferrule 207B, and also one end of the receive side circuit board 302b is formed with a connection terminal 309b, and a card edge connector 310b.

Optical Fiber Cable 316

As shown in FIG. 21, a transmitting/receiving optical fiber cable 316 is a bundle of transmit side optical fiber cable 204A and receive side optical fiber cable 204B.

An end of the transmitting/receiving optical fiber cable 316 is provide with a protective cover 317 formed of a resin for protecting the end of the transmitting/receiving optical fiber cable 316. The protective cover 317 is formed of a rubber boot, for example, that protects the transmitting/receiving optical fiber cable 316 so that the transmit side optical fiber cable 204A and the receive side optical fiber cable 204B are not bent beyond an allowable bend radius.

The transmitting/receiving optical fiber cable 316 branches at that end into the transmit side optical fiber cable 204A and the receive side optical fiber cable 204B. An end of the transmit side optical fiber cable 204A is provide with the MT ferrule 207A, while an end of the receive side optical fiber cable 204B is provide with the MT ferrule 7B.

Chassis 305, Upper Chassis 303 and Lower Chassis 304

The optical module 300 includes the chassis 305 for accommodating both the substrates 301 and 302.

The chassis 305 is formed to be split into the upper chassis 303 and the lower chassis 304. The upper chassis 303 and the lower chassis 304 are formed of a metal. The upper chassis 303 and the lower chassis 304 are fixed with screws not shown.

The rear faces (in FIG. 21, the left-hand near faces) of the upper chassis 303 and the lower chassis 304 are formed with engagement flanges 303a and 304a for engaging the protective cover 317 formed of a rubber boot provided at the end of the transmitting/receiving optical fiber cable 316. The transmitting/receiving optical fiber cable 316 is fixed to the chassis 305, by engaging the protective cover 317 formed of a rubber boot onto these engagement flanges 303a and 304a.

Spacer 312

Figure 26:
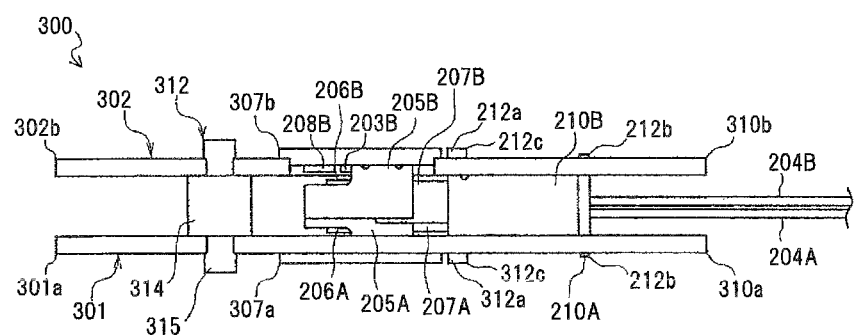
FIG. 26 is a side view showing the optical module of FIG. 21 when the transmit and receive side substrates are overlapped on top of each other.

As shown in FIGS. 21 and 26, the spacer 312 is a member for holding the transmit side substrate 301 and the receive side substrate 302 at a specified distance therebetween. The spacer 312 comprises a plate 313, prismatic supports 314 formed to protrude upward and downward a specified height from both ends respectively of the plate 313, and pins 315 formed to further protrude upward and downward from both the supports 314 respectively. The plate 313, the supports 314 and the pins 315 are formed integrally.

The spacer 312 is attached to between the transmit side circuit board 301a and the receive side circuit board 302b by inserting the downward protruding pins 315 into the spacer fixing notches 311a of the transmit side circuit board 301a, and the upward protruding pins 315 into the spacer fixing notches 311b of the receive side circuit board 302b. In this case, the respective lower faces of the supports 314 contact the surface of the transmit side circuit board 301a, while the respective upper faces of the supports 314 contact the surface of the receive side circuit board 302b.

Further, with the optical module 300 in this embodiment, the optical connector frames 210A and 210B also serve as spacers, so that the transmit side circuit board 301a and the receive side circuit board 302b are held at a specified distance therebetween by the above-described spacer 312, and the optical connector frames 210A and 210B.

The optical connector frame 210A provided on the transmit side circuit board 301a contacts the surface of the transmit side circuit board 301a at its lower portion, and the surface of the receive side circuit board 302b at its upper portion. Also, the optical connector frame 210B provided on the receive side circuit board 302b contacts the surface of the receive side circuit board 302b at its lower portion, and the surface of the transmit side circuit board 301a at its upper portion.

In this manner, the optical connector frames 210A and 210B also serve as spacers, thereby eliminating the need to provide a separate spacer, and therefore eliminating the need to ensure a space for providing the spacer on the substrates 301 and 102, thus contributing to low cost and small size of the optical module 300.

Also, with the optical module 300, the optical connector frame 210A is pressed toward the transmit side circuit board 301a by the receive side circuit board 302b, while the optical connector frame 210B is pressed toward the receive side circuit board 302b by the transmit side circuit board 301a. The optical connector frames 210A and 210B are therefore unlikely to slip from the substrates 301 and 302.

The length between the upper and lower faces of the supports 314 of the spacer 312, and the vertical height of the optical connector frames 210A and 210B may be the same as the distance to be held between the card edge connector 310a of the transmit side circuit board 301a and the card edge connector 310b of the receive side circuit board 302b, defined by the I/O interface standard. The optical module 300 is constructed to receive the flanges 207c that are the protruding portions of the MT ferrules 207A and 207B, in the receiving holes 308a and 308b, respectively, and further fix the lens blocks 206A and 206B and the lens frames 205A and 205B to the bases 307a and 307b provided on the reverse sides of the circuit boards 301a and 302b to block the notches of the circuit boards 301a and 302b respectively, thereby allowing the height between the MT ferrule 207A and 207B and lens block 206A and 206B connecting portions, and the circuit boards 301a and 302b respectively to be lowered. Thus, it is possible to adapt to even where the space between both the circuit boards 301a and 302b is narrow.

Also, the side ribs 210a of the optical connector frames 210A and 210B may each be formed with an upward protrusion which protrudes upward, so that the upper portions of those upward protrusions contact the circuit boards 302b and 301a opposite. This reduces the contact area of the optical connector frames 210A and 210B with the circuit boards 302b and 301a opposite, therefore allowing high degrees of freedom of wiring patterns formed on the surfaces of both the circuit boards 301a and 302b respectively. Further, the upward protrusions may be bent to be formed in a leaf spring shape. This allows the upward protrusions to be inhibited from damaging portions of the circuit boards 301a and 302b which the upward protrusions have contacted.

Also, the optical connector frames 210A and 210B and the lens frames 205A and 205B may be electrically connected with ground patterns of the circuit boards 301a and 302b, so that noise to the optical elements 203A and 203B is isolated at the optical connector frames 210A and 210B and the lens frames 205A and 205B. In this case, it is desirable that there be no gap between the optical connector frames 210A and 210B and the lens frames 205A and 205B, by extending the side ribs 210a of the optical connector frames 210A and 210B to the lens frames 205A and 205B.

The invention should not be limited to the above embodiments, but various alterations may be made without departing from the spirit and scope of the invention.

What is claimed is:

1. An optical connector and lens block connecting structure, comprising:

a substrate;

an optical element mounted on the substrate, having an optical path perpendicular to the substrate;

a lens frame comprising two side ribs, and a fore rib for connecting both of the two side ribs at one end, the lens frame being fixed to the substrate in such a manner as to surround the optical element;

a lens block for converting the optical path of the optical element to an optical path parallel to the substrate, the lens block being bonded and fixed between the two side ribs of the lens frame with its optical axis aligned with an optical axis of the optical element;

an optical connector provided at a fore end of an optical fiber cable, the optical connector being arranged parallel to the substrate;

an optical connector frame comprising two side ribs which surround two sides of the optical connector, and a rear rib for connecting the two side ribs at an other end; and an elastic member interposed between the rear rib of the optical connector frame and the optical connector, wherein the optical connector frame is fixed to the substrate such that the optical connector is mounted to the lens block while the rear rib of the optical connector frame allows the elastic member to press the optical connector toward the lens block, wherein the optical connector frame includes a protrusion which protrudes downward from the optical connector frame, the substrate includes an engagement hole that is engaged onto the protrusion of the optical connector frame, and the optical connector frame is fixed to the substrate by engaging the protrusion into the engagement hole of the substrate.

2. The optical connector and lens block connecting structure according to claim 1, wherein
the protrusion comprises a fore protrusion which protrudes downward from one end of the two side ribs of the optical connector frame, and a rear protrusion which protrudes downward from the rear rib of the optical connector frame, and
the fore protrusion includes a hook for preventing the optical connector frame from slipping upward from the substrate, the hook extending from a lower end of the fore protrusion to the other end.

3. The optical connector and lens block connecting structure according to claim 1, wherein
the rear rib of the optical connector frame comprises a notch through which the optical fiber cable is passed.

4. An optical module, comprising:
the optical connector and lens block connecting structure according to claim 1.

5. An optical module, comprising:
a transmit side substrate; and
a receive side substrate,
a first optical connector and lens block connecting structure formed on a surface of the transmit side substrate, the first optical connector and lens block connecting structures comprising:
a first optical element mounted on the transmit side substrate, having an optical path perpendicular to the transmit side substrate;
a first lens frame comprising two side ribs, and a fore rib for connecting both of the two side ribs at one end, the first lens frame being fixed to the transmit side substrate in such a manner as to surround the first optical element;
a first lens block for converting the optical path of the first optical element to an optical path parallel to the transmit side substrate, the first lens block being bonded and fixed between the two side ribs of the first lens frame with its optical axis aligned with an optical axis of the first optical element;
a first optical connector provided at a fore end of a first optical fiber cable, the first optical connector being arranged parallel to the transmit side substrate;
a first optical connector frame comprising two side ribs which surround both sides of the first optical connector, and a rear rib for connecting the two side ribs at an other end; and
a first elastic member interposed between the rear rib of the first optical connector frame and the first optical connector,
wherein the first optical connector frame is fixed to the transmit side substrate such that the first optical connector is mounted to the first lens block while the rear rib of the first optical connector frame allows the first elastic member to press the first optical connector toward the first lens block,
a second optical connector and lens block connecting structure formed on a surface of the receive side substrate, the second optical connector and lens block connecting structures comprising:
a second optical element mounted on the receive side substrate, having an optical path perpendicular to the receive side substrate;
a second lens frame comprising two side ribs, and a fore rib for connecting both of the two side ribs at one end, the second lens frame being fixed to the receive side substrate in such a manner as to surround the second optical element;
a second lens block for converting the optical path of the second optical element to an optical path parallel to the receive side substrate, the second lens block being bonded and fixed between the two side ribs of the second lens frame with its optical axis aligned with an optical axis of the second optical element;
a second optical connector provided at a fore end of a second optical fiber cable, the second optical connector being arranged parallel to the receive side substrate;
a second optical connector frame comprising two side ribs which surround both sides of the second optical connector, and a rear rib for connecting the two side ribs at an other end; and
a second elastic member interposed between the rear rib of the second optical connector frame and the second optical connector,
wherein the second optical connector frame is fixed to the receive side substrate such that the second optical connector is mounted to the second lens block while the rear rib of the second optical connector frame allows the second elastic member to press the second optical connector toward the second lens block,
wherein each of the first and second optical connector frames comprises a vertical height that is a distance to be held between the transmit side substrate and the receive side substrate, and
wherein the transmit side substrate and the receive side substrate are arranged on top of each other with the respective surfaces facing each other, so that the transmit side substrate and the receive side substrate are held at a specified distance therebetween by the respective surfaces of the transmit side substrate and the receive side substrate contacting the first and second optical connector frames opposite.

6. An optical connector and lens block connecting structure, comprising:
a substrate;
an optical element mounted on the substrate, having an optical path perpendicular to the substrate;
a lens frame fixed to the substrate in such a manner as to surround the optical element;
a lens block for converting the optical path of the optical element to an optical path parallel to the substrate, the lens block being bonded and fixed to the lens frame with its optical axis aligned with an optical axis of the optical element;
an optical connector provided at a fore end of an optical fiber cable, the optical connector being arranged parallel to the substrate;
an optical connector frame comprising two side ribs which surround both sides of the optical connector, and a rear rib for connecting those two side ribs at an other end; and
an elastic member interposed between the rear rib of the optical connector frame and the optical connector,
wherein the optical connector frame is fixed to the substrate such that the optical connector is mounted to the lens block while the rear rib of the optical connector frame allows the elastic member to press the optical connector toward the lens block,
wherein the substrate includes a receiving hole for receiving a protruding portion of the optical connector, and the protruding portion of the optical connector is received in the receiving hole when the optical connector and the lens block are connected with each other.

7. The optical connector and lens block connecting structure according to claim 6, wherein
the substrate comprises a circuit board formed with a notch, and a base provided to block the notch on a reverse side of the circuit board,
the receiving hole is formed in the circuit board, and
the lens block and the lens frame are fixed to a surface of the base.

8. The optical connector and lens block connecting structure according to claim 6, wherein
the optical connector frame includes a protrusion that protrudes downward from the optical connector frame,
the substrate includes an engagement hole around the receiving hole that is engaged onto the protrusion of the optical connector frame, and
the optical connector frame is fixed to the substrate, by engaging the protrusion into the engagement hole of the substrate.

9. The optical connector and lens block connecting structure according to claim 6, wherein
the optical connector comprises an MT ferrule, and
the protruding portion comprises a flange formed at a rear end of the MT ferrule.

10. An optical module, comprising:
the optical connector and lens block connecting structure according to claim 6.

11. An optical module, comprising:
a transmit side substrate; and
a receive side substrate,
a first optical connector and lens block connecting structure formed on a surface of the transmit side substrate, the first optical connector and lens block connecting structures comprising:
a first optical element mounted on the transmit side substrate, having an optical path perpendicular to the substrate;
a first lens frame fixed to the transmit side substrate in such a manner as to surround the first optical element;
a first lens block for converting the optical path of the first optical element to an optical path parallel to the transmit side substrate, the first lens block being bonded and fixed to the first lens frame with its optical axis aligned with an optical axis of the first optical element; and
a first optical connector provided at a fore end of a first optical fiber cable, the first optical connector being arranged parallel to the transmit side substrate,
wherein the transmit side substrate includes a first receiving hole for receiving a protruding portion of the first optical connector, and
the protruding portion of the first optical connector is received in the first receiving hole when the first optical connector and the first lens block are connected with each other,
a second optical connector and lens block connecting structure formed on a surface of the receive side substrate, the second optical connector and lens block connecting structures comprising:
a second optical element mounted on the receive side substrate, having an optical path perpendicular to the substrate;
a second lens frame fixed to the receive side substrate in such a manner as to surround the second optical element;
a second lens block for converting the optical path of the second optical element to an optical path parallel to the receive side substrate, the second lens block being bonded and fixed to the second lens frame with its optical axis aligned with an optical axis of the second optical element; and
a second optical connector provided at a fore end of a second optical fiber cable, the second optical connector being arranged parallel to the receive side substrate,
wherein the receive side substrate includes a second receiving hole for receiving a protruding portion of the second optical connector, and
the protruding portion of the second optical connector is received in the second receiving hole when the second optical connector and the second lens block are connected with each other,
wherein each of the first and second optical connector frames comprises a vertical height that is a distance to be held between the transmit side substrate and the receive side substrate, and
wherein the transmit side substrate and the receive side substrate are arranged on top of each other with the respective surfaces facing each other, so that the transmit side substrate and the receive side substrate are held at a specified distance therebetween by the respective surfaces of the transmit side substrate and the receive side substrate contacting the first and second optical connector frames opposite.

* * * * *